(12) United States Patent
Tomono et al.

(10) Patent No.: US 9,628,647 B2
(45) Date of Patent: Apr. 18, 2017

(54) SCREEN GENERATING APPARATUS, SCREEN GENERATING METHOD, AND NON-TRANSITORY COMPUTER-READABLE RECORDING MEDIUM ENCODED WITH SCREEN GENERATING PROGRAM

(71) Applicant: Konica Minolta, Inc., Chiyoda-ku (JP)

(72) Inventors: Kazuaki Tomono, Okazaki (JP); Tadashi Suzue, Toyohashi (JP); Chohiko Fukuoh, Musashimurayama (JP); Hiroaki Sugimoto, Nagoya (JP); Manabu Furukawa, Nagaokakyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 98 days.

(21) Appl. No.: 14/476,794

(22) Filed: Sep. 4, 2014

(65) Prior Publication Data

US 2015/0070398 A1 Mar. 12, 2015

(30) Foreign Application Priority Data

Sep. 9, 2013 (JP) ................................. 2013-186727

(51) Int. Cl.
*G09G 5/00* (2006.01)
*H04N 1/00* (2006.01)

(52) U.S. Cl.
CPC ..... *H04N 1/00503* (2013.01); *H04N 1/00413* (2013.01); *H04N 2201/0075* (2013.01)

(58) Field of Classification Search
None
See application file for complete search history.

(56) References Cited

U.S. PATENT DOCUMENTS 5,689,665 A 11/1997 Mitsui et al.
8,872,855 B2 * 10/2014 Doll .................. G09G 5/14
345/649

(Continued)

FOREIGN PATENT DOCUMENTS

JP 2000-298647 A 10/2000
JP 2007-166259 A 6/2007

(Continued)

OTHER PUBLICATIONS

Office Action (Notice of Ground of Rejection) issued on Jul. 21, 2015, by the Japanese Patent Office in corresponding Japanese Patent Application No. 2013-186727, and an English Translation of the Office Action. (7 pages).

(Continued)

*Primary Examiner* — Ryan R Yang
(74) *Attorney, Agent, or Firm* — Buchanan Ingersoll & Rooney PC

(57) ABSTRACT

A screen generating apparatus includes a reference screen information acquiring portion to acquire reference screen information, the reference screen information including a plurality of components classified into one or more sets and layout information for disposing the components in a reference screen, a screen size acquiring portion to acquire a screen size of a display portion, a set area determining portion to determine, for each of the one or more sets, a converted area corresponding to the set in a display screen, on the basis of the acquired screen size and the layout information included in the reference screen information, and a component disposing portion to dispose the components included in the reference screen information, in the converted areas within the display screen corresponding respectively to the one or more sets, each component being disposed in the same size as that in the reference screen.

20 Claims, 19 Drawing Sheets

(56) References Cited

U.S. PATENT DOCUMENTS

| | | | | |
|---|---|---|---|---|
| 2013/0159841 A1* | 6/2013 | Yokoyama | ......... | H04N 1/00411 |
| | | | | 715/243 |
| 2014/0225930 A1* | 8/2014 | Durmek | ................ | G09G 5/363 |
| | | | | 345/659 |
| 2014/0368547 A1* | 12/2014 | Elings | ....................... | G06T 3/60 |
| | | | | 345/659 |

FOREIGN PATENT DOCUMENTS

| | | |
|---|---|---|
| JP | 2011-232913 A | 11/2011 |
| JP | 2013-130964 A | 7/2013 |

OTHER PUBLICATIONS

Office Action (First Office Action) issued on Jan. 4, 2017, by the State Intellectual Property Office of the People's Republic of China in corresponding Chinese Patent Application No. 201410453988.7 and English Translation of the Office Action. (10 pages).

\* cited by examiner

F I G. 1
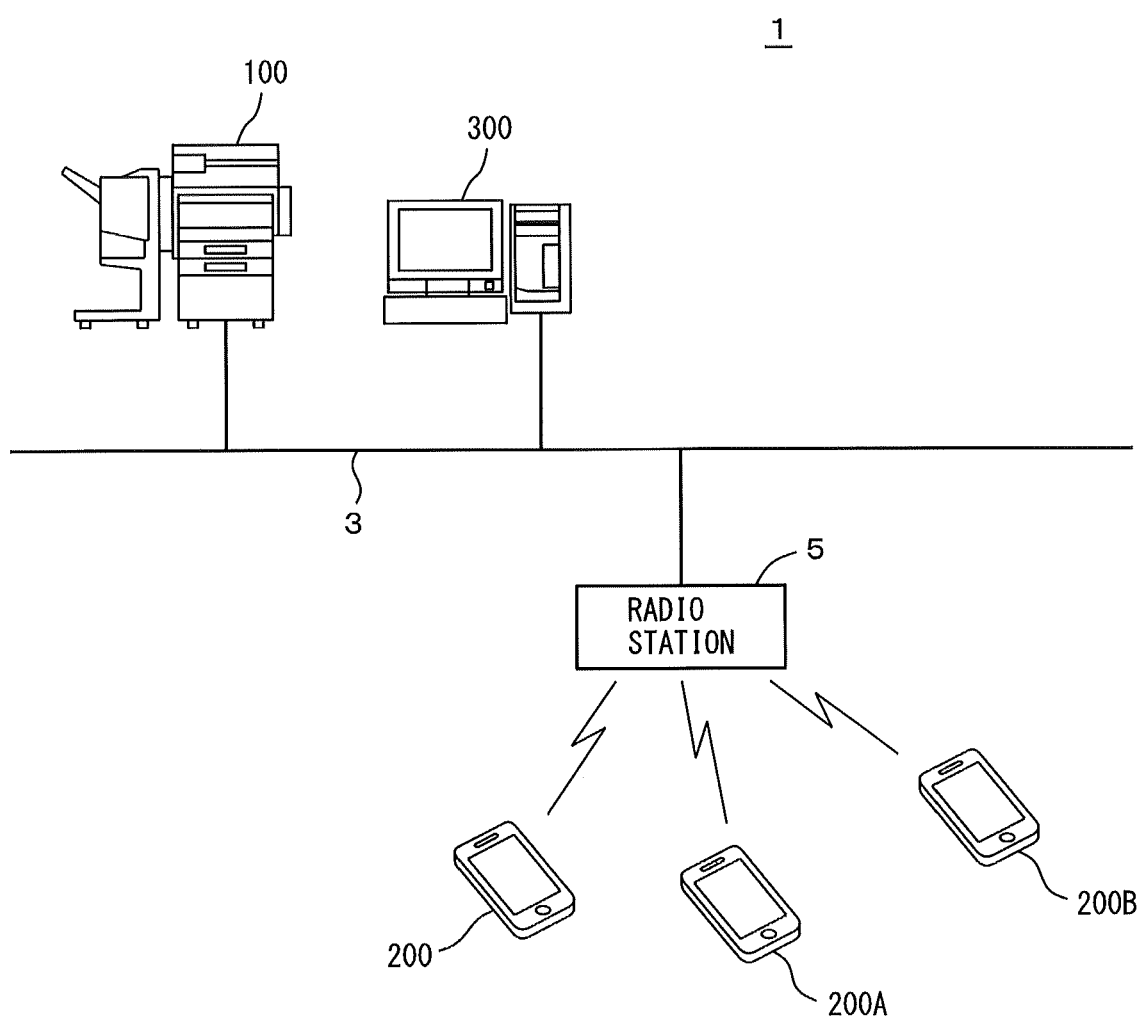

F I G. 7

| SET | LAYOUT INFORMATION ||||||||
|---|---|---|---|---|---|---|---|---|
| | AREA INFORMATION ||||||||
| | HORIZONTAL |||| VERTICAL ||||
| | REFERENCE SIZE | SIZE CHANGEABILITY | MINIMUM SIZE | PRIORITY | REFERENCE SIZE | SIZE CHANGEABILITY | MINIMUM SIZE | PRIORITY |
| FIRST SET | 1000 | VARIABLE | 200 | 1 | 200 | FIXED | — | 1 |
| SECOND SET | 600 | FIXED | — | 2 | 200 | FIXED | — | 2 |
| THIRD SET | 200 | FIXED | — | 3 | 600 | VARIABLE | 200 | 3 |
| FOURTH SET | 200 | FIXED | — | 4 | 300 | VARIABLE | 100 | 4 |
| FIFTH SET | 1400 | VARIABLE | 100 | 6 | 600 | VARIABLE | 200 | 6 |
| SIXTH SET | 1400 | VARIABLE | 200 | 5 | 300 | FIXED | — | 5 |

| SET | LAYOUT INFORMATION |||||
|---|---|---|---|---|---|
| | POSITIONAL INFORMATION |||| COMPONENTS |
| | UPPER SIDE | LOWER SIDE | LEFT SIDE | RIGHT SIDE | |
| FIRST SET | — | FIFTH SET | — | SECOND SET | FIRST COMPONENT |
| SECOND SET | — | THIRD SET, FIFTH SET | FIRST SET | — | SECOND COMPONENT |
| THIRD SET | SECOND SET | FOURTH SET | FIFTH SET | — | THIRD TO FIFTH COMPONENTS |
| FOURTH SET | THIRD SET | — | SIXTH SET | — | SIXTH TO EIGHTH COMPONENTS |
| FIFTH SET | FIRST SET, SECOND SET | SIXTH SET | — | THIRD SET | NINTH COMPONENT |
| SIXTH SET | FIFTH SET | — | — | FOURTH SET | TENTH TO SIXTEENTH COMPONENTS |

FIG. 8

| VERTICAL-RANGE SHARING GROUP | SET | SET |
|---|---|---|
| FIRST VERTICAL-RANGE SHARING GROUP | FIRST SET | SECOND SET |
| SECOND VERTICAL-RANGE SHARING GROUP | THIRD SET | FIFTH SET |
| THIRD VERTICAL-RANGE SHARING GROUP | FOURTH SET | SIXTH SET |

FIG. 9

| HORIZONTAL-RANGE SHARING GROUP | SET | SET | SET |
|---|---|---|---|
| FIRST HORIZONTAL-RANGE SHARING GROUP | FIRST SET | FIFTH SET | SIXTH SET |
| SECOND HORIZONTAL-RANGE SHARING GROUP | SECOND SET | FIFTH SET | SIXTH SET |
| THIRD HORIZONTAL-RANGE SHARING GROUP | SECOND SET | THIRD SET | FOURTH SET |

FIG. 10

CONVERTED AREAS

| SET | HORIZONTAL SIZE | VERTICAL SIZE |
|---|---|---|
| FIRST SET | 600 | 200 |
| SECOND SET | 600 | 200 |
| THIRD SET | 200 | 466 |
| FOURTH SET | 200 | 233 |
| FIFTH SET | 1000 | 400 |
| SIXTH SET | 1000 | 300 |

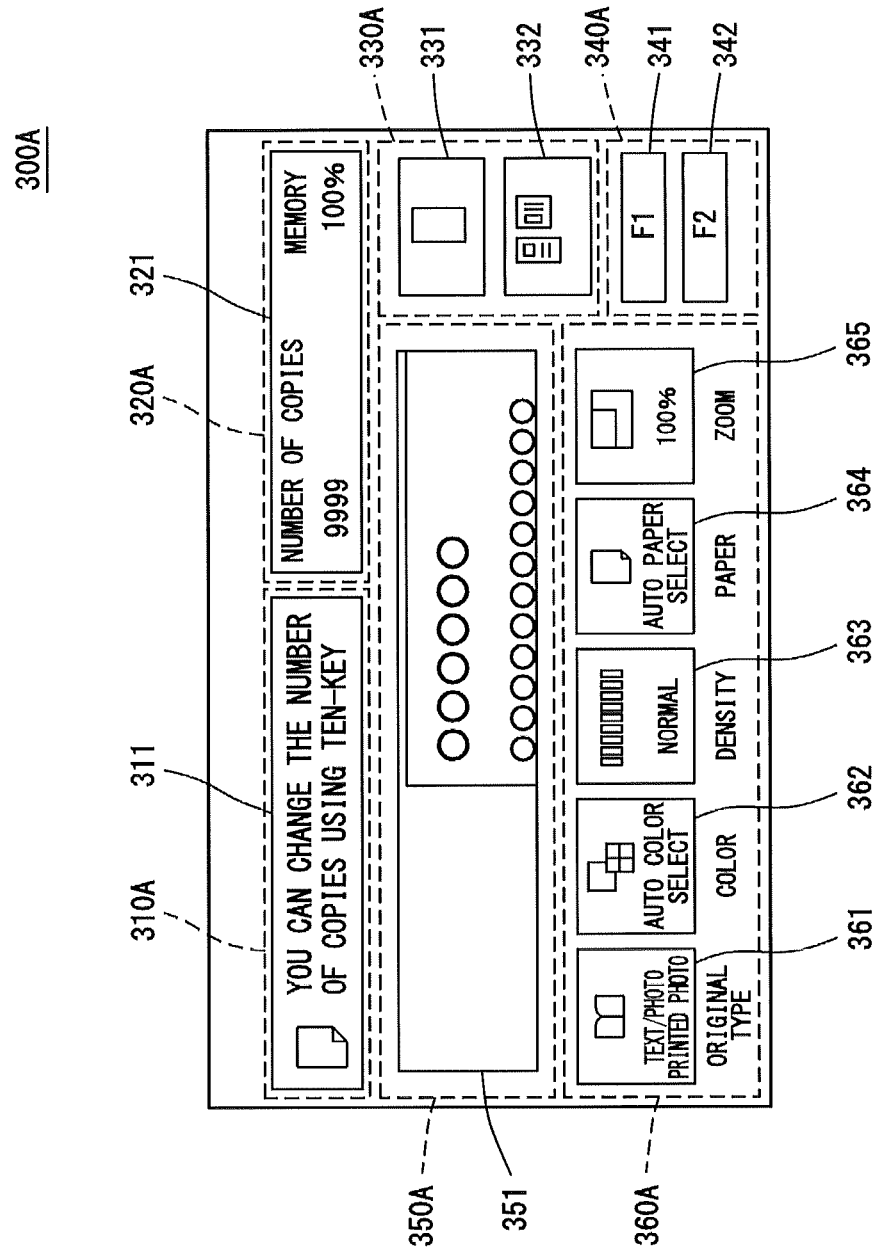

F I G. 1 8
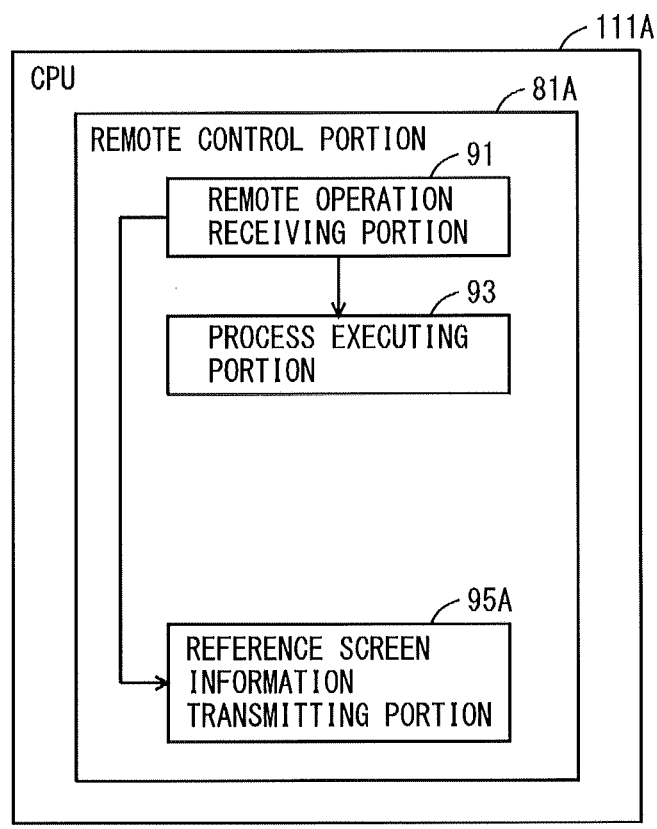

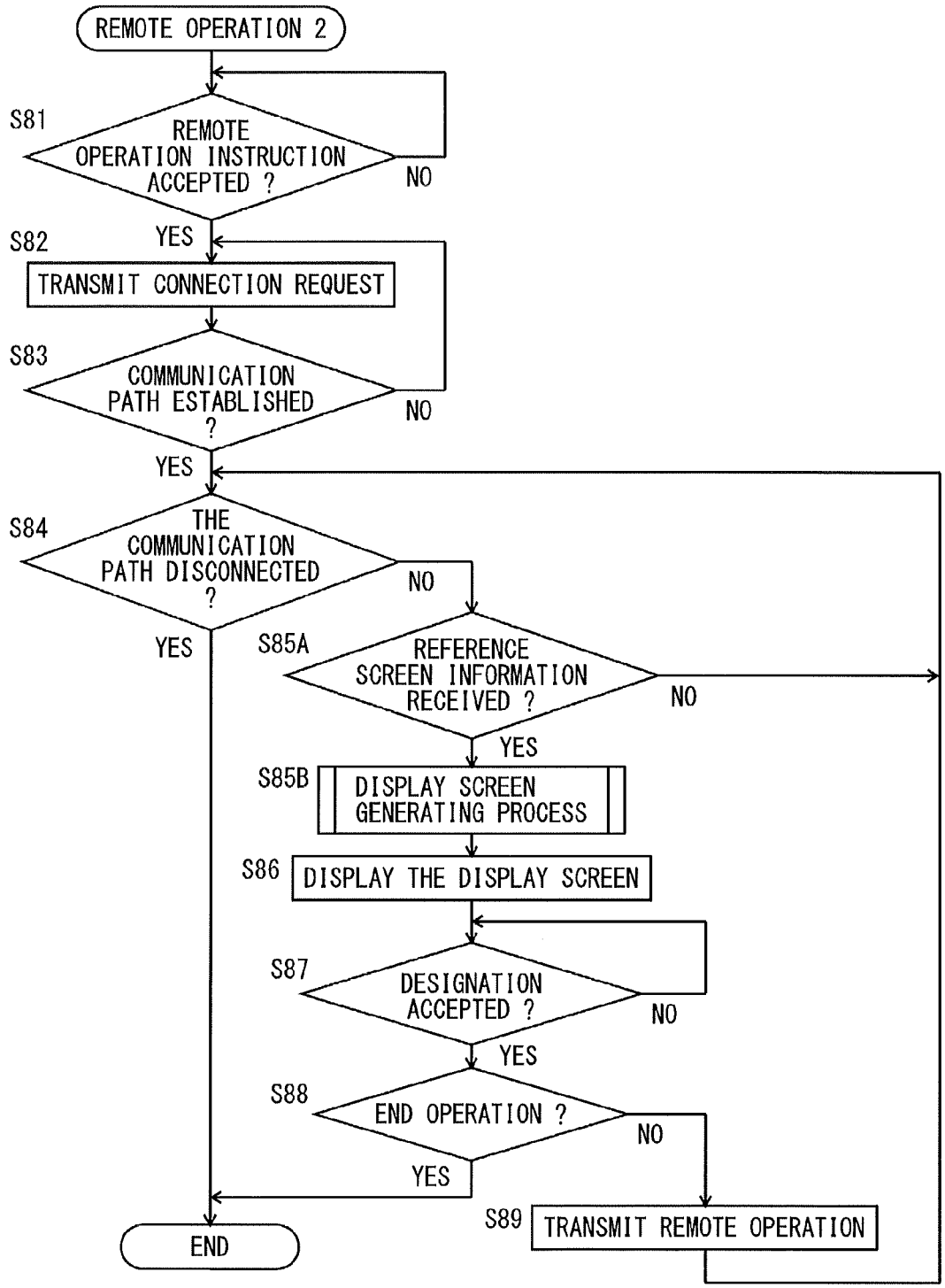

SCREEN GENERATING APPARATUS, SCREEN GENERATING METHOD, AND NON-TRANSITORY COMPUTER-READABLE RECORDING MEDIUM ENCODED WITH SCREEN GENERATING PROGRAM

This application is based on Japanese Patent Application No. 2013-186727 filed with Japan Patent Office on Sep. 9, 2013, the entire content of which is hereby incorporated by reference.

BACKGROUND OF THE INVENTION

Field of the Invention

The present invention relates to a screen generating apparatus, a screen generating method, and a non-transitory computer-readable recording medium encoded with a screen generating program. More particularly, the present invention relates to a screen generating apparatus which is able to generate screens having the same content and different sizes, a screen generating method which is executed by the screen generating apparatus, and a non-transitory computer-readable recording medium encoded with a screen generating program which is executed by a computer controlling the screen generating apparatus.

Description of the Related Art

A multi-function peripheral (hereinafter, referred to as "MFP") displays a setting screen in order to accept a setting value for executing a process. The setting screen is stored in an MFP in advance. Accordingly, setting screens need to be prepared for the MFPs having display surfaces of different sizes. In order to address this problem, Japanese Patent Laid-Open No. 2007-166259 discloses an image processing apparatus which includes: an image processing unit which performs processing on image data; a display unit which displays an operation screen for causing the image processing unit to perform the processing; a definition information storage unit which holds, in advance, a plurality of types of options display order definition information for defining the enumerating order of, among a plurality of setting items about the processing performed in the image processing unit, the setting items that are to be selectably enumerated on the operation screen; a condition information storage unit which holds, in advance, information for specifying the size of a display area on the operation screen in which the setting items can be enumerated; a definition information switching unit which fetches one piece out of the plurality of pieces of options display order definition information held in the definition information storage unit, the options display order definition information to be fetched being switched in accordance with the size of the display area specified by the information held in the condition information storage unit; and a display content configuration unit which configures an operation screen on which the setting items are enumerated in the order specified by the options display order definition information fetched by the definition information switching unit, and causes the display unit to display the operation screen.

In the conventional image processing apparatus, however, it is necessary to presume a plurality of display surface sizes and prepare pieces of options display order definition information corresponding respectively to the presumed sizes. Therefore, it may not be able to generate an operation screen for a display surface the size of which has not been presumed.

Particularly, in recent years, a technique of remotely operating an MFP using a mobile information device such as a smartphone or a tablet terminal has been known. With this technique, a setting screen for operating the MFP may be displayed on the mobile information device. This requires the MFP to address different sizes of display surfaces included in a variety of mobile information devices.

SUMMARY OF THE INVENTION

An aspect of the present invention provides a screen generating apparatus which includes: a reference screen information acquiring portion to acquire reference screen information, the reference screen information including a plurality of components classified into one or more sets and layout information for disposing the plurality of components in a reference screen; a screen size acquiring portion to acquire a screen size of a display portion; a set area determining portion to determine, for each of the one or more sets, a converted area corresponding to the set in a display screen, on the basis of the acquired screen size and the layout information included in the reference screen information; and a component disposing portion to dispose the plurality of components included in the reference screen information, in the converted areas within the display screen corresponding respectively to the one or more sets, each component being disposed in the same size as that in the reference screen.

Another aspect of the present invention provides a screen generating method which includes: a reference screen information acquiring step of acquiring reference screen information, the reference screen information including a plurality of components classified into one or more sets and layout information for disposing the plurality of components in a reference screen; a screen size acquiring step of acquiring a screen size of a display portion; a set area determining step of determining, for each of the one or more sets, a converted area corresponding to the set in a display screen, on the basis of the acquired screen size and the layout information included in the reference screen information; and a component disposing step of disposing the plurality of components included in the reference screen information, in the converted areas within the display screen corresponding respectively to the one or more sets, each component being disposed in the same size as that in the reference screen.

A further aspect of the present invention provides a non-transitory computer-readable recording medium encoded with a screen generating program which causes a computer to perform: a reference screen information acquiring step of acquiring reference screen information, the reference screen information including a plurality of components classified into one or more sets and layout information for disposing the plurality of components in a reference screen; a screen size acquiring step of acquiring a screen size of a display portion; a set area determining step of determining, for each of the one or more sets, a converted area corresponding to the set in a display screen, on the basis of the acquired screen size and the layout information included in the reference screen information; and a component disposing step of disposing the plurality of components included in the reference screen information, in the converted areas within the display screen corresponding respectively to the one or more sets, each component being disposed in the same size as that in the reference screen.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 1 schematically shows a print system according to an embodiment of the present invention;

FIG. 7 shows exemplary reference screen information;

FIG. 8 shows exemplary vertical-range sharing groups;

FIG. 9 shows exemplary horizontal-range sharing groups;

FIG. 10 shows exemplary sizes of converted areas;

FIG. 11 shows an exemplary display screen;

FIG. 18 is a block diagram showing, by way of example, the functions of a CPU included in the MFP according to a modification;

FIG. 21 is a flowchart illustrating an exemplary flow of the remote operation process according to the modification.

DESCRIPTION OF THE PREFERRED EMBODIMENTS

Figure 2:
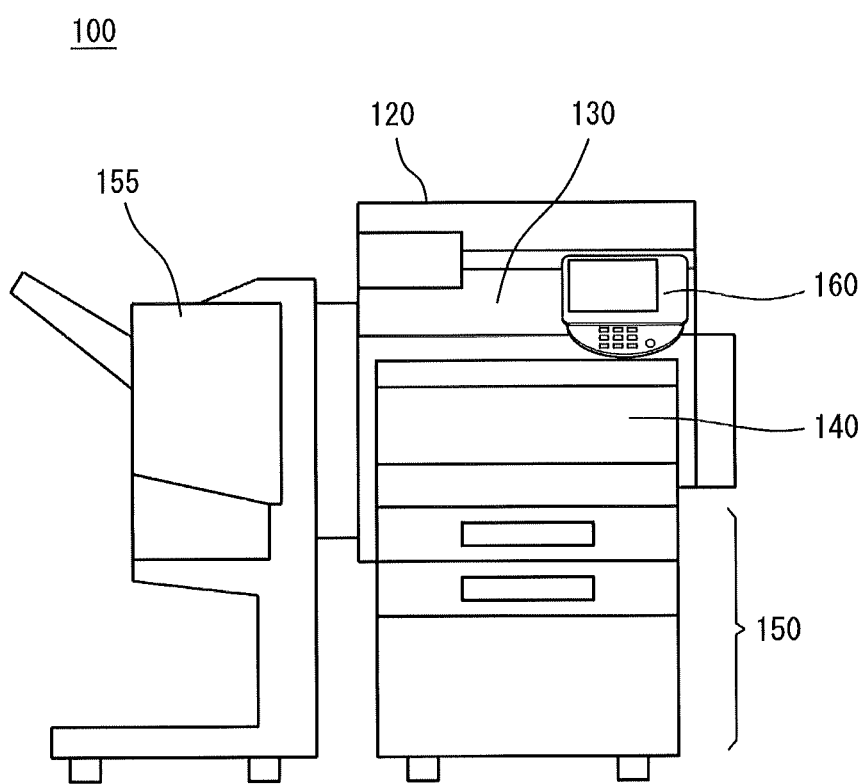
FIG. 2 is a perspective view of an MFP.

The preferred embodiments of the present invention will be described below in conjunction with the drawings. In the following description, the same or corresponding parts are denoted by the same reference characters. Their names and functions are also the same. Thus, a detailed description thereof will not be repeated.

FIG. 1 schematically shows a print system according to an embodiment of the present invention. Referring to FIG. 1, a print system 1 includes a multi-function peripheral (hereinafter, referred to as "MFP") 100 which functions as an image processing apparatus, a personal computer (hereinafter, referred to as "PC") 300, a radio station 5, and mobile information devices 200, 200A, and 200B. MFP 100 and PC 300 are each connected to a network 3. Mobile information devices 200, 200A, and 200B are each connected to network 3 through radio station 5.

Network 3 is a local area network (LAN), which may be connected in a wired or wireless manner. Network 3 is not necessarily the LAN; it may be a wide area network (WAN), a public switched telephone network (PSTN), the Internet, or the like.

PC 300 is a typical computer. PC 300 has installed therein a printer driver program corresponding to MFP 100. PC 300 can control MFP 100 by executing the printer driver program, to cause MFP 100 to perform an image forming process, a document reading process, and so on.

Mobile information devices 200, 200A, and 200B are computers, such as smartphones and personal digital assistants (PDAs), which are carried and used by users. As mobile information devices 200, 200A, and 200B have the same hardware configuration and functions, mobile information device 200 will be described representatively, unless specifically stated otherwise. It is here assumed that mobile information device 200 is a smartphone and includes a wireless LAN function and a conversation function. Mobile information device 200 can therefore communicate with a mobile phone base station in a wireless manner so as to be connected to a mobile phone network for conversation.

In print system 1 according to the present embodiment, mobile information device 200 has installed therein a remote operation program for remotely controlling MFP 100, and it functions as a remote operation device for remotely controlling MFP 100. When a user who operates mobile information device 200 inputs a remote operation, mobile information device 200 transmits a remote control command to MFP 100. On the other hand, MFP 100 has installed therein a remote control program for receiving a remote control command from mobile information device 200 and executing a process in accordance with the received remote control command. While it is assumed in the present embodiment that the remote operation program for remotely controlling MFP 100 is installed in mobile information device 200, the remote operation program for remotely controlling MFP 100 may be installed in PC 300. In such a case, a user can control MFP 100 remotely by using PC 300, as in the case of controlling MFP 100 remotely by using mobile information device 200.

Figure 3:
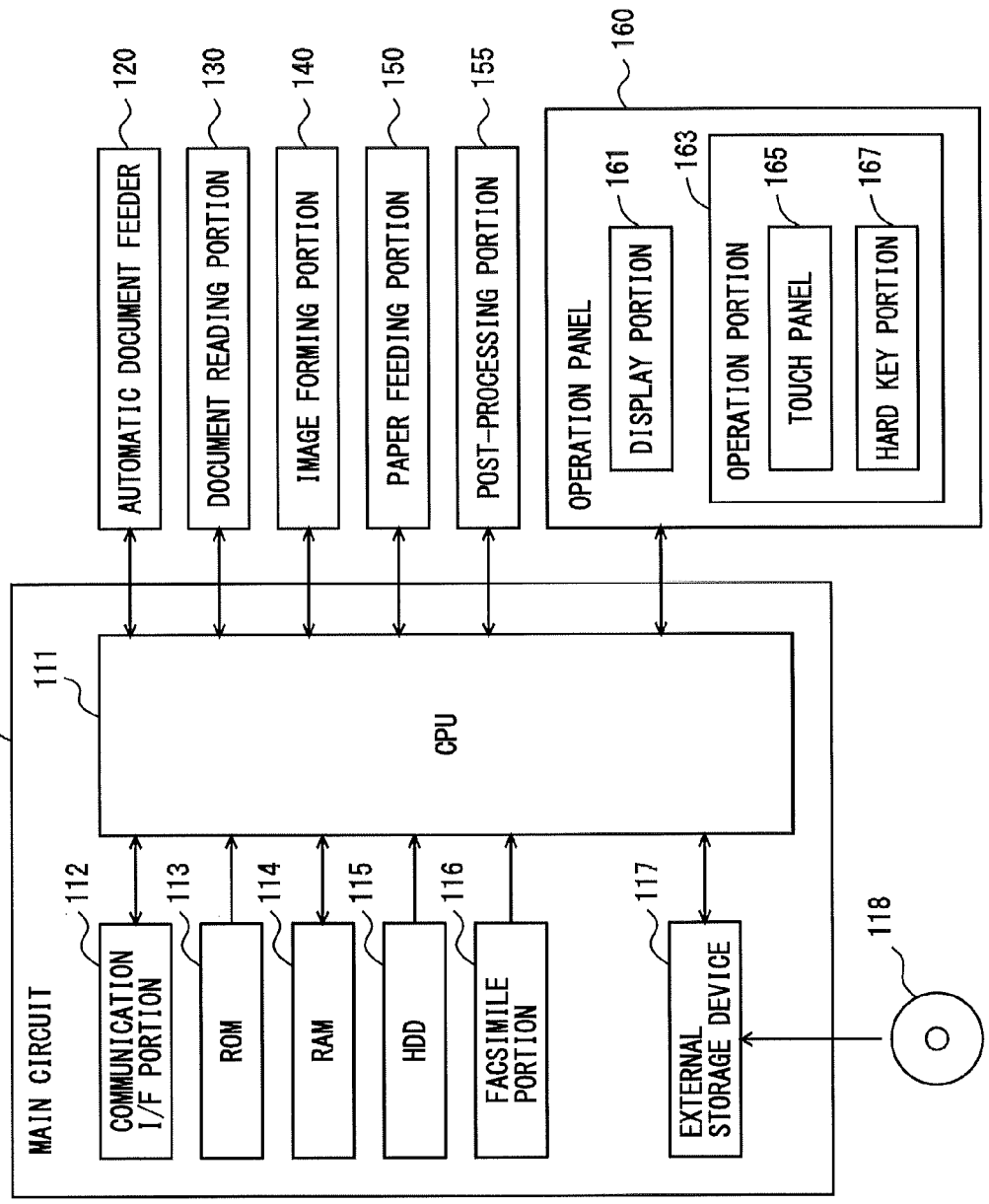
FIG. 3 is a block diagram schematically showing the hardware configuration of the MFP.

FIG. 2 is a perspective view of the MFP. FIG. 3 is a block diagram schematically showing the hardware configuration of the MFP. Referring to FIGS. 2 and 3, MFP 100 includes: a main circuit 110; a document reading portion 130 which reads a document; an automatic document feeder 120 which feeds a document to document reading portion 130; an image forming portion 140 which forms an image on a sheet of paper or the like on the basis of image data output from document reading portion 130 that has read a document; a paper feeding portion 150 which supplies sheets of paper to image forming portion 140; a post-processing portion 155 which processes sheets of paper on which images have been formed; and an operation panel 160 serving as a user interface.

Post-processing portion 155 performs a sorting process of sorting and discharging one or more sheets of paper on which images have been formed by image forming portion 140, a hole-punching process of punching the sheets, and a stapling process of stapling the sheets.

Main circuit 110 includes a central processing unit (CPU) 111, a communication interface (I/F) portion 112, a read only memory (ROM) 113, a random access memory (RAM) 114, a hard disk drive (HDD) 115 as a mass storage, a facsimile portion 116, and an external storage device 117 on which a compact disc ROM (CD-ROM) 118 is mounted. CPU 111 is connected with automatic document feeder 120, document reading portion 130, image forming portion 140, paper feeding portion 150, post-processing portion 155, and operation panel 160, and is responsible for overall control of MFP 100.

ROM 113 stores a program executed by CPU 111 or data necessary for execution of the program. RAM 114 is used as a work area when CPU 111 executes a program. RAM 114 also includes a setting value storage area and a setting screen storage area. The setting value storage area is an area which stores a setting value for performing a process. The setting screen storage area is an area which stores a setting screen to be displayed on a display portion 161 included in operation panel 160. Further, RAM 114 temporarily stores read data (image data) continuously transmitted from document reading portion 130.

Operation panel 160, which is provided on an upper surface of MFP 100, includes a display portion 161 and an operation portion 163. Display portion 161 is a display such as a liquid crystal display (LCD) or an organic electro-luminescence display (ELD), and displays an instruction menu for the user, information about acquired image data, and others. Operation portion 163 includes a hard key portion 167 having a plurality of keys, and accepts input data, such as instructions, characters, and numerical characters, according to the key operations by the user. Operation portion 163 further includes a touch panel 165 disposed on display portion 161.

Communication I/F portion 112 is an interface for connecting MFP 100 to network 3. CPU 111 communicates with PC 300 or mobile information device 200, 200A, or 200B via communication I/F portion 112 for data transmission/reception. Further, communication I/F portion 112 is able to communicate with a computer connected to the Internet via network 3.

Facsimile portion 116 is connected to public switched telephone networks (PSTN), and transmits facsimile data to or receives facsimile data from the PSTN. Facsimile portion 116 stores the received facsimile data into HDD 115, or outputs the data to image forming portion 140. Image forming portion 140 prints on a sheet of paper the facsimile data received by facsimile portion 116 Further, facsimile portion 116 converts the data stored in HDD 115 to facsimile data, and transmits the facsimile data to a facsimile machine connected to the PSTN.

External storage device 117 is mounted with CD-ROM 118. CPU 111 is capable of accessing CD-ROM 118 via external storage device 117. CPU 111 loads the program stored in CD-ROM 118 which is mounted on external storage device 117, into RAM 114 for execution. It is noted that the medium for storing a program executed by CPU 111 is not restricted to CD-ROM 118. It may be an optical disc (magneto-optical (MO) disc, mini disc (MD), digital versatile disc (DVD)), an IC card, an optical card, or a semiconductor memory such as a mask ROM, an erasable programmable ROM (EPROM), an electrically erasable and programmable ROM (EEPROM), or the like.

Further, the program executed by CPU 111 is not restricted to the program stored in CD-ROM 118; a program stored in HDD 115 may be loaded into RAM 114 for execution. In this case, another computer connected to network 3 may rewrite the program stored in HDD 115 of MFP 100, or may additionally write a new program therein. Further, MFP 100 may download a program from another computer connected to network 3, and store the program in HDD 115. As used herein, the "program" includes, not only the program which CPU 111 can execute directly, but also a source program, a compressed program, an encrypted program, and others.

Figure 4:
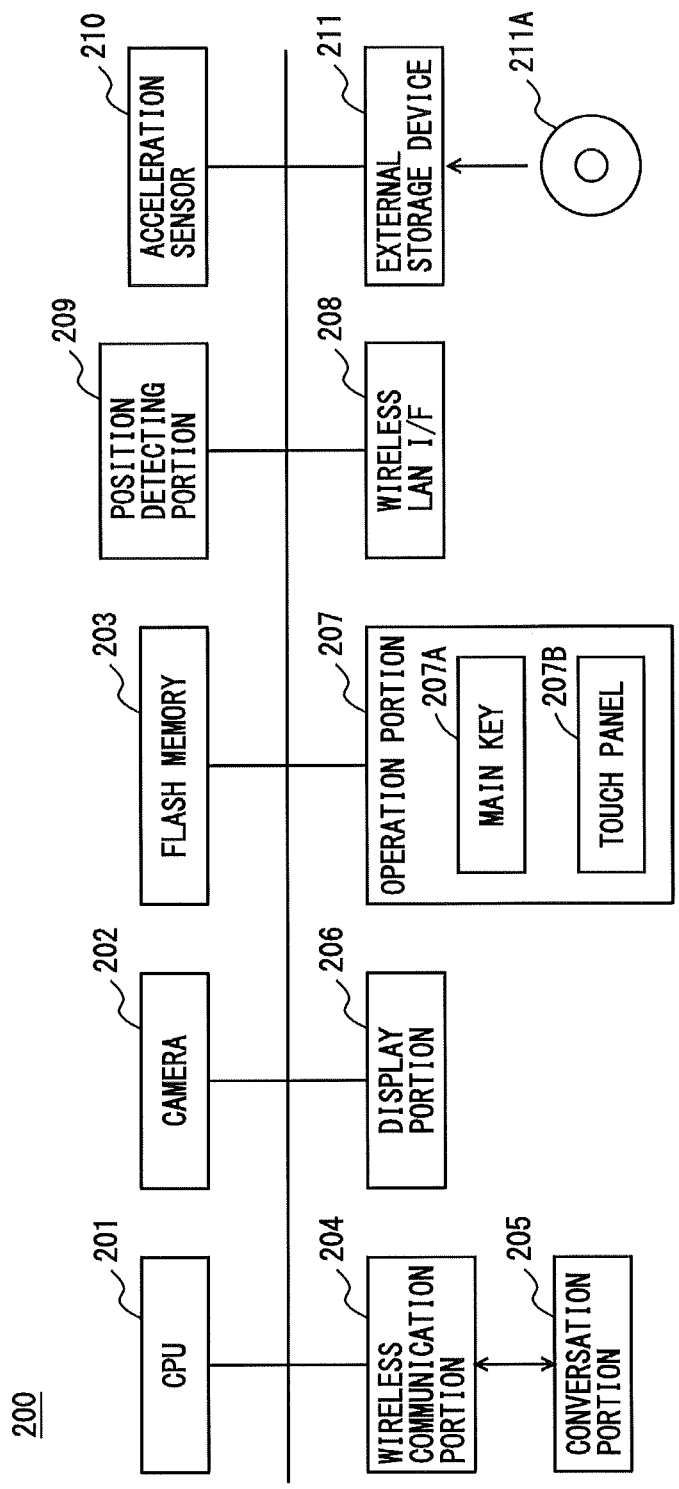
FIG. 4 is a block diagram schematically showing the hardware configuration of a mobile information device.

FIG. 4 is a block diagram schematically showing the hardware configuration of the mobile information device. Referring to FIG. 4, mobile information device 200 according to the present embodiment includes: a CPU 201 which is responsible for overall control of mobile information device 200; a camera 202; a flash memory 203 which stores data in a non-volatile manner; a wireless communication portion 204 which is connected to a conversation portion 205; a display portion 206 which displays information; an operation portion 207 which accepts operations by a user; a wireless LAN I/F 208; a position detecting portion 209; an acceleration sensor 210; and an external storage device 211.

Display portion 206 is a display such as an LCD or an organic ELD, and displays an instruction menu for the user, information about acquired image data, and others. Operation portion 207 includes a main key 207A and a touch panel 207B. When a user designates a position on the display surface of display portion 206, operation portion 207 outputs the position on the display surface detected by touch panel 207B, to CPU 201. CPU 201 detects the position designated by the user on the screen being displayed on display portion 206, on the basis of the position detected by touch panel 207B. CPU 201 accepts input data such as instructions, characters, and numerical characters corresponding to the operations by the user, on the basis of the screen being displayed on display portion 206 and the positions detected by touch panel 207B. For example, in the case where a screen including an image of the ten-key pad is displayed on display portion 206, CPU 201 accepts a number corresponding to the key that is displayed in the position detected by touch panel 207B.

Camera 202 is provided with a lens and a photoelectric conversion element. The lens collects light and focuses it onto the photoelectric conversion element, which in turn performs photoelectric conversion of the received light to output image data to CPU 201. The photoelectric conversion element includes a complementary metal oxide semiconductor (CMOS) sensor, a charge-coupled device (CCD) sensor, or the like. Camera 202 is placed such that its image pick-up range includes a user who views display portion 206. Specifically, camera 202 is arranged such that its optical axis is approximately parallel to the normal to the display surface of display portion 206, and that its image pick-up direction is the same as the direction in which the display surface faces. In other words, when a user views display portion 206, the user's face is included in the image pick-up range of camera 202.

Wireless communication portion 204 communicates in a wireless manner with a mobile phone base station connected to a telephone communication network. Wireless communication portion 204 connects mobile information device 200 to the telephone communication network to enable a conversation using conversation portion 205. Wireless communication portion 204 decodes sound signals, obtained by demodulating wireless signals received from the mobile phone base station, and outputs the decoded sound signals to conversation portion 205. Wireless communication portion 204 encodes sound input from conversation portion 205, and transmits the encoded sound to the mobile phone base station. Conversation portion 205 has a microphone and a speaker. Conversation portion 205 outputs the sound input from wireless communication portion 204, from the speaker, and outputs the sound input from the microphone, to wireless communication portion 204. Furthermore, wireless communication portion 204 is controlled by CPU 201, and connects mobile information device 200 to an e-mail server for transmission/reception of e-mail.

Wireless LAN I/F 208 is an interface for communicating with radio station 5 to connect mobile information device 200 to network 3. Internet protocol (IP) addresses of PC 300 and MFP 100 may be registered in advance in mobile information device 200, so that mobile information device 200 can communicate with PC300 and MFP 100 for transmission/reception of data. While it is assumed in the present embodiment that mobile information device 200 uses wireless LAN I/F 208 to communicate with PC 300 and MFP 100, mobile information device 200 may use another communication method. Specifically, in the case where mobile information device 200, PC 300, and MFP 100 each have a Bluetooth (registered trademark) or other short range radio communication device, mobile information device 200 may communicate with PC 300 or MFP 100 on a one-to-one basis.

Flash memory 203 stores a program executed by CPU 201 or data necessary for execution of the program. CPU 201 loads the program stored in flash memory 203, into a RAM included in CPU 201, for execution.

Position detecting portion 209 detects a current position of mobile information device 200. Specifically, position detecting portion 209, which is a global positioning system (GPS) receiver, receives radio waves from a plurality of GPS satellites to measure a current position. Position detecting portion 209 outputs a value indicating the measured current position, which may be, for example, a set of the latitude and longitude, to CPU 201.

Acceleration sensor 210 detects an acceleration of mobile information device 200. Acceleration sensor 210 outputs the detected acceleration to CPU 201.

External storage device 211 is detachably attached to mobile information device 200, and it can be mounted with a CD-ROM 211A in which a remote operation program is stored. CPU 201 is capable of accessing CD-ROM 211A via external storage device 211. CPU 201 can load the remote operation program stored in CD-ROM 211A which is mounted on external storage device 211, into a RAM included in CPU 201, for execution.

While the program stored in flash memory 203 or CD-ROM 211A has been described as a program executed by CPU 201, another computer connected to network 3 may rewrite the program stored in flash memory 203, or may additionally write a new program therein. Further, mobile information device 200 may download a program from another computer connected to network 3. As used herein, the "program" includes, not only the program which CPU 201 can execute directly, but also a source program, a compressed program, an encrypted program, and others.

It is noted that the medium for storing the program executed by CPU 201 is not restricted to CD-ROM 211A. It may be an optical disc (MO, MD, or DVD), an IC card, an optical card, or a semiconductor memory such as a mask ROM, an EPROM, an EEPROM, or the like.

Figure 5:
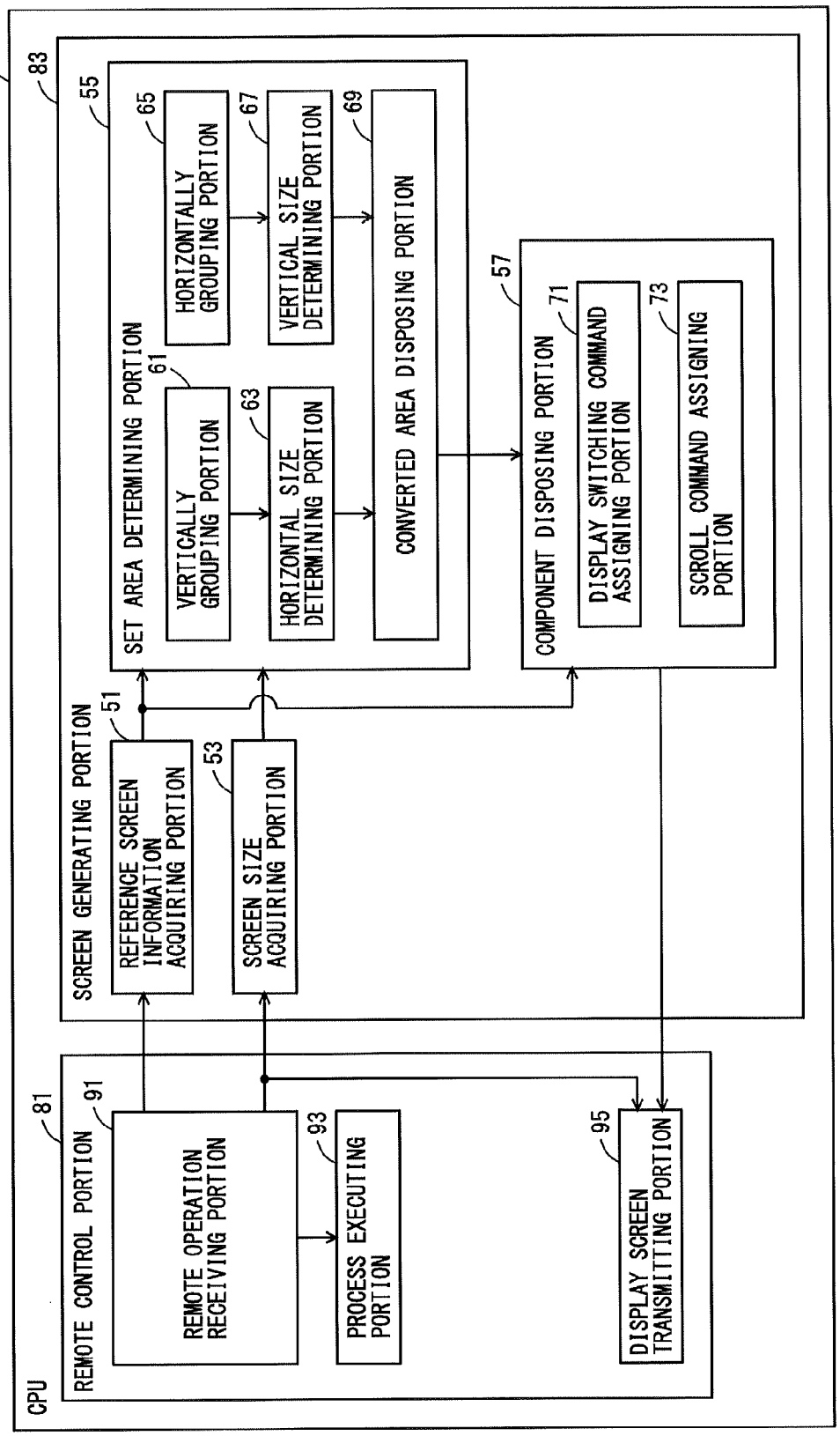
FIG. 5 is a block diagram showing, by way of example, the functions of a CPU included in the MFP.

FIG. 5 is a block diagram showing, by way of example, the functions of the CPU included in the MFP. The functions shown in FIG. 5 are formed in CPU 111 included in MFP 100 as CPU 111 executes a remote control program stored in ROM 113, HDD 115, or CD-ROM 118. Referring to FIG. 5, CPU 111 includes: a remote control portion 81 which executes a process in accordance with a remote operation received from a remote operation device, and a screen generating portion 83 which generates a display screen.

Remote control portion 81 transmits a display screen to a remote operation device in response to a request from the remote operation device, and executes a process in accordance with a remote operation received from the remote operation device. Here, it is assumed that a request is received from mobile information device 200 and that mobile information device 200 serves as the remote operation device. Screen generating portion 83 generates a display screen in accordance with an instruction input from remote control portion 81, and outputs the generated display screen to remote control portion 81. Remote control portion 81 and screen generating portion 83 will be described in detail below.

Remote control portion 81 includes: a remote operation receiving portion 91; a process executing portion 93; and a display screen transmitting portion 95. Remote operation receiving portion 91 controls communication I/F portion 112 to receive a remote operation transmitted from a remote operation device. Here, mobile information device 200 transmits a remote operation, and remote operation receiving portion 91 receives the remote operation from mobile information device 200.

A remote operation includes a setting operation for setting a setting value, a screen switching operation for changing a setting screen, and an execution instructing operation for instructing execution of a process. When remote operation receiving portion 91 receives a setting operation, it outputs a setting command for instructing setting of a setting value specified by the setting operation, to process executing portion 93. When remote operation receiving portion 91 receives an execution instructing operation, it outputs an execution command for instructing execution of a process specified by the execution instructing operation, to process executing portion 93. When remote operation receiving portion 91 receives a screen switching operation, it outputs screen identification information for identifying the display screen specified by the screen switching operation, to screen generating portion 83. Remote operation receiving portion 91 also outputs device identification information for identifying the remote operation device from which the remote operation was received, to display screen transmitting portion 95 and screen generating portion 83. As the device identification information, any information may be used as long as it can identify the remote operation device. Here, a network address, such as an Internet protocol (IP) address or a media access control (MAC) address, is used.

Display screen transmitting portion 95 receives a display screen from screen generating portion 83, and receives the device identification information of mobile information device 200 from remote operation receiving portion 91. Display screen transmitting portion 95 controls communication I/F portion 112 to transmit the display screen to mobile information device 200 specified by the device identification information. As a result, the display screen is displayed by mobile information device 200.

When process executing portion 93 receives a setting command from remote operation receiving portion 91, process executing portion 93 changes the setting value. When process executing portion 93 receives an execution command from remote operation receiving portion 91, process executing portion 93 executes the process specified by the execution command, in accordance with the setting value. The processes executed by process executing portion 93 include: a scanning process of controlling automatic document feeder 120 and document reading portion 130 to read an image of a document; an image forming process of controlling image forming portion 140, paper feeding portion 150, and post-processing portion 155 to form an image on a sheet of paper; a data management process of reading data from or writing data to HDD 115 or CD-ROM 118; a facsimile process of controlling facsimile portion 116 to transmit or receive facsimile data; and a data transmitting/receiving process of controlling communication I/F portion 112 to transmit or receive data. The processes executed by process executing portion 93 also include processes as combinations of two or more of the above processes. For example, the processes include: a copying process as a combination of the scanning process and the image forming process; a scan-to-transmit process, as a combination of the scanning process and the data transmitting process, of transmitting the image data obtained by reading a document image; and a scan-to-BOX process, as a combination of the scanning process and the data management process, of storing in HDD 115 the image data obtained by reading a document image.

Screen generating portion 83 includes: a reference screen information acquiring portion 51, a screen size acquiring portion 53, a set area determining portion 55, and a component disposing portion 57. Reference screen information acquiring portion 51 receives screen identification information of a display screen from remote operation receiving portion 91. The display screen is a screen which, when MFP 100 is remotely operated by a remote operation device, MFP 100 transmits to the remote operation device, so that it is displayed by the remote operation device.

Reference screen information acquiring portion 51 acquires reference screen information specified by the screen identification information, and outputs the acquired reference screen information to set area determining portion 55 and component disposing portion 57. Here, the reference screen information is stored in advance in HDD 115 in association with each reference screen. Reference screen information acquiring portion 51 reads, from among a plurality of pieces of reference screen information stored in HDD 115, the reference screen information that is specified by the screen identification information.

The reference screen information includes: a plurality of components which have been classified into one or more sets; and layout information for disposing the plurality of components in a reference screen. The reference screen is a setting screen which is displayed on display portion 161 of MFP 100. The reference screen includes a plurality of components. The display screen corresponds to the reference screen and includes the same components as those included in the reference screen. The components include: a notifying component for notifying a user of a setting value; and an instruction accepting component for accepting a user instruction. The notifying component includes, for example, an area for displaying a setting item, and an area for displaying a setting value corresponding to the setting item. The instruction accepting component includes a button to which a command is assigned. The command includes a command for switching a setting screen, and a command for causing process executing portion 93 to execute a process. The command includes, for example, a setting command for changing a setting value, and an execution command for executing a process in accordance with a setting value.

The plurality of components included in the reference screen have been classified into one or more sets. Each set includes one or more components. The layout information includes, for each of the one or more sets, positional information which indicates a relative positional relationship, within the reference screen, between an area corresponding to the set and area(s) corresponding respectively to the other set(s). The layout information also includes, for each of the one or more sets, a size of the area corresponding to the set, and shrinkability information for each of the vertical and horizontal directions of the relevant area. For the set determined to be shrinkable, the layout information further includes a minimum display size and a priority for each of the vertical and horizontal directions. The shrinkability information indicates whether the corresponding area is shrinkable or not. Here, the set whose area is determined to be shrinkable in the vertical direction will be called a "vertically variable set", and the set whose area is determined to be unshrinkable in the vertical direction will be called a "vertically fixed set". The set whose area is determined to be shrinkable in the horizontal direction will be called a "horizontally variable set", and the set whose area is determined to be unshrinkable in the horizontal direction will be called a "horizontally fixed set".

Each set is associated with a rectangular area within the reference screen. In the area corresponding to a set, one or more components included in the set are disposed. To this end, an area corresponding to a set has its size determined in the vertical direction and in the horizontal direction. The size of an area corresponding to a set is determined by the vertical size and the horizontal size. The position of an area corresponding to a set within the reference screen is determined as a position of that area relative to one or more areas corresponding respectively to the other one or more sets. Here, the position of one set within the reference screen is indicated by the sets whose areas are adjacent to the area corresponding to that set at its upper, lower, right, and left sides, respectively.

Figure 6:
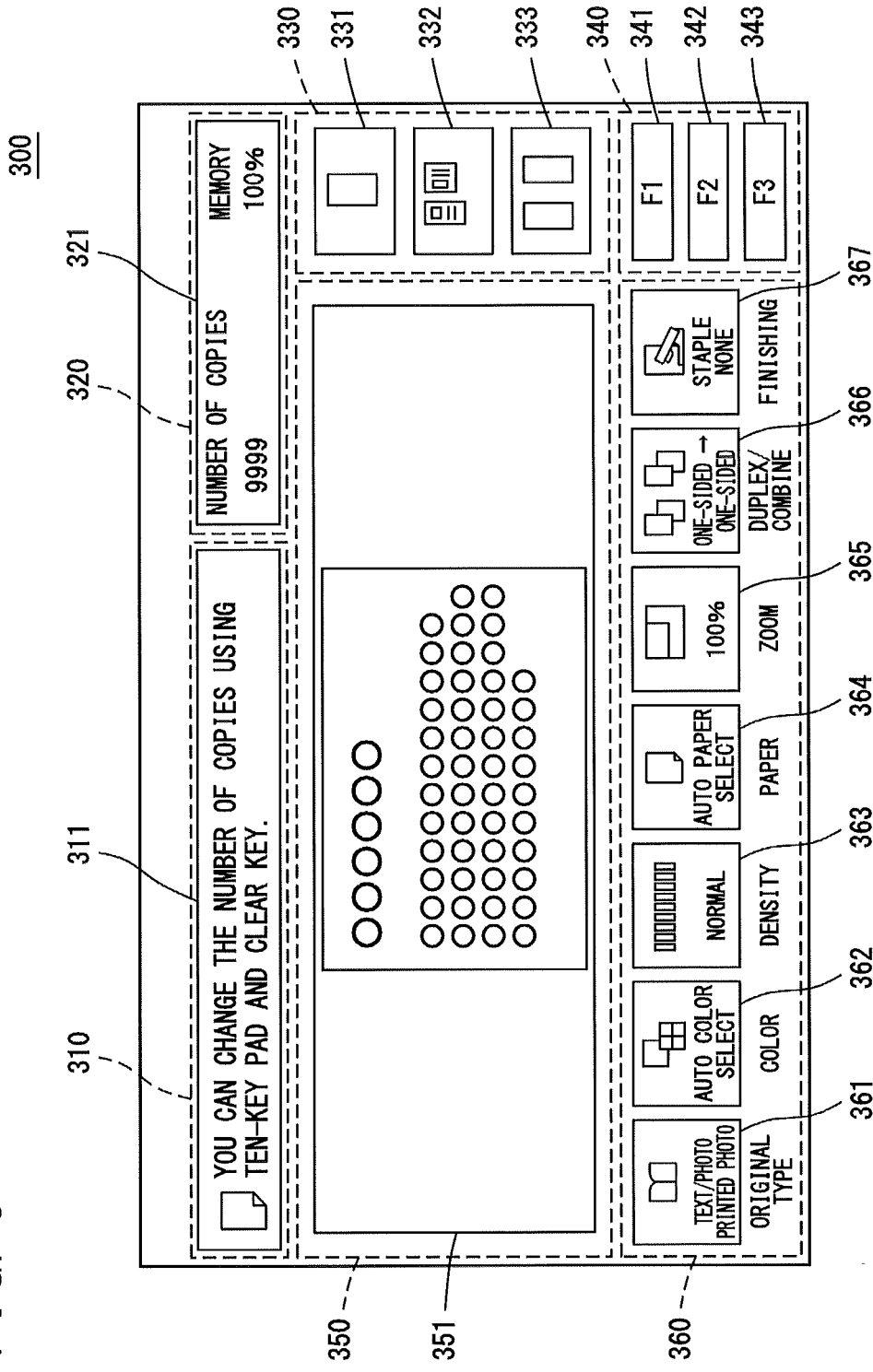
FIG. 6 shows an exemplary setting screen.

FIG. 6 shows an exemplary setting screen. Referring to FIG. 6, a setting screen 300 includes: a first component 311, a second component 321, third to fifth components 331 to 333, sixth to eighth components 341 to 343, a ninth component 351, and tenth to sixteenth components 361 to 367, which are classified into first through sixth sets, respectively. An area 310 for the first set includes first component 311. An area 320 for the second set includes second component 321. An area 330 for the third set includes third to fifth components 331 to 333. An area 340 for the fourth set includes sixth to eighth components 341 to 343. An area 350 for the fifth set includes ninth component 351. An area 360 for the sixth set includes tenth to sixteenth components 361 to 367.

Area 310 for the first set is adjacent to area 320 for the second set at its right side, and adjacent to area 350 for the fifth set at its lower side. Area 320 for the second set is adjacent to area 310 for the first set at its left side, and adjacent to area 330 for the third set and area 350 for the fifth set at its lower side. Area 330 for the third set is adjacent to area 320 for the second set at its upper side, adjacent to area 350 for the fifth set at its left side, and adjacent to area 340 for the fourth set at its lower side. Area 340 for the fourth set is adjacent to area 330 for the third set at its upper side, and adjacent to area 360 for the sixth set at its left side. Area 350 for the fifth set is adjacent to area 310 for the first set and area 320 for the second set at its upper side, adjacent to area 330 for the third set at its right side, and adjacent to area 360 for the sixth set at its lower side. Area 360 for the sixth set is adjacent to area 350 for the fifth set at its upper side, and adjacent to area 340 for the fourth set at its right side.

It should be noted that the reference screen may be divided vertically into M parts (where M is an integer of one or greater) and horizontally into N parts (where N is an integer of one or greater) to thereby obtain M×N sub areas, and a position of an area of each of one or more sets within the reference screen may be indicated by one or more sub areas that are included in the area of the relevant set. In this case as well, the position of the area of each of the one or more sets within the reference screen can be indicated as its position relative to the area(s) of the other set(s).

FIG. 7 shows exemplary reference screen information. The reference screen information shown in FIG. 7 corresponds to setting screen 300 shown in FIG. 6. Here, it is assumed that setting screen 300 has 1600 pixels in the horizontal direction and 1100 pixels in the vertical direction. Referring to FIG. 7, the reference screen information includes reference records corresponding respectively to the first to sixth sets. Each reference record includes a "set" field, a "layout information" field, and a "components" field. In the "set" field, the set identification information for specifying the set is set. In the "components" field, component identification information for identifying any component that has been classified in that set specified by the set identification information set in the "set" field is set.

The "layout information" field includes an "area information" field and a "positional information" field. The "area information" field includes, for each of the "vertical" and "horizontal" directions, a "reference size" field, a "size changeability" field, a "minimum size" field, and a "priority" field. The "reference size" field indicates the size within the reference screen. Here, the size is represented in pixels. In the "size changeability" field, a value indicating whether the size is changeable or not is set. If the size is changeable, "variable" is set. If the size is not changeable, "fixed" is set. The "minimum size" field has a value set therein when "variable" is set in the corresponding "size changeability" field. In the "minimum size" field, the minimum size of the area is set. The "priority" field indicates the priorities among the sets.

The "positional information" field includes four fields of an "upper side" field, a "lower side" field, a "left side" field, and a "right side" field, and pieces of set identification information for identifying the sets which are adjacent to that set at the respective sides are set in the corresponding fields.

Returning to FIG. 5, screen size acquiring portion 53 receives, from remote operation receiving portion 91, device identification information for identifying the remote operation device from which a remote operation was received, and acquires a screen size of the remote operation device specified by the device identification information. Specifically, screen size acquiring portion 53 controls communication I/F portion 112 to transmit a screen size acquisition request to the remote operation device that is specified by the device identification information input from remote operation receiving portion 91. The remote operation device that received the screen size acquisition request, which is here mobile information device 200, returns the screen size of display portion 206. The screen size includes the number of pixels in the vertical direction and the number of pixels in the horizontal direction. Alternatively, the screen size may be a combination of the lengths in the vertical and horizontal directions and a resolution. Screen size acquiring portion 53 outputs the acquired screen size, to set area determining portion 55.

Set area determining portion 55 includes: a vertically grouping portion 61, a horizontal size determining portion 63, a horizontally grouping portion 65, a vertical size determining portion 67, and a converted area disposing portion 69.

Vertically grouping portion 61 groups any sets, among the one or more sets included in the reference screen information received from reference screen information acquiring portion 51, having their corresponding areas horizontally aligned with each other, into a vertical-range sharing group. That is, the plurality of areas corresponding respectively to the plurality of sets included in the same vertical-range sharing group at least partially share a common range in the vertical direction.

FIG. 8 shows exemplary vertical-range sharing groups. The groups shown in FIG. 8 are generated on the basis of the reference screen information, shown in FIG. 7, which corresponds to setting screen 300 shown in FIG. 6. Referring to FIG. 8, the first set (area 310) and the second set (area 320) are classified as a first vertical-range sharing group, the third set (area 330) and the fifth set (area 350) are classified as a second vertical-range sharing group, and the fourth set (area 340) and the sixth set (area 360) are classified as a third vertical-range sharing group.

Returning to FIG. 5, vertically grouping portion 61 outputs, for each vertical-range sharing group, the plurality of sets included in the group, to horizontal size determining portion 63. Here, for the first vertical-range sharing group, the first set (area 310) and the second set (area 320) are output. For the second vertical-range sharing group, the third set (area 330) and the fifth set (area 350) are output. For the third vertical-range sharing group, the fourth set (area 340) and the sixth set (area 360) are output.

Horizontal size determining portion 63 receives a plurality of sets for each vertical-range sharing group from vertically grouping portion 61, and receives a screen size from screen size acquiring portion 53. For each vertical-range sharing group, horizontal size determining portion 63 determines a horizontal size of any horizontally variable set that is included in the sets classified in the relevant vertical-range sharing group, on the basis of a horizontal size of any horizontally fixed set included in the group and a horizontal size of the screen size. More specifically, for a horizontally fixed set, its horizontal size is determined to be the horizontal size that has been determined for the area of that set by the layout information. The horizontal size of the horizontally fixed set is subtracted from the horizontal size of the screen size, to obtain a remainder. Then, the horizontal size of the horizontally variable set is determined to be a value obtained by adding the remainder to the minimum horizontal size that has been determined for the area of that set by the layout information. In the case where there is more than one horizontally variable set, horizontal size determining portion 63 distributes the remainder to the horizontally variable sets in accordance with their priorities. Here, the remainder is distributed proportionally according to the priorities. For example, suppose that there are a first horizontally variable set and a second horizontally variable set, and that the minimum size of the first horizontally variable set is MHL1, the minimum size of the second horizontally variable set is MHL2, the remainder is RHL, the priority of the first horizontally variable set is 1, and the priority of the second horizontally variable set is 2. Then, the remainder RHL is distributed to the first and second horizontally variable sets in the ratio of 2:1. Therefore, the horizontal size of the first horizontally variable set becomes MHL1+RHL×⅔. The horizontal size of the second horizontally variable set becomes MHL2+RHL×⅓. After having determined the horizontal sizes of the plurality of sets, horizontal size determining portion 63 outputs the horizontal sizes of the respective sets included in the reference screen information, to converted area disposing portion 69.

Horizontally grouping portion 65 groups any sets, among the one or more sets included in the reference screen information received from reference screen information acquiring portion 51, having their corresponding areas vertically aligned with each other, into a horizontal-range sharing group. That is, the plurality of areas corresponding respectively to the plurality of sets included in the same horizontal-range sharing group at least partially share a common range in the horizontal direction.

FIG. 9 shows exemplary horizontal-range sharing groups. The groups shown in FIG. 9 are generated on the basis of the reference screen information, shown in FIG. 7, which corresponds to setting screen 300 shown in FIG. 6. Referring to FIG. 9, the first set (area 310), the fifth set (area 350), and the sixth set (area 360) are classified as a first horizontal-range sharing group, the second set (area 320), the fifth set (area 350), and the sixth set (area 360) are classified as a second horizontal-range sharing group, and the second set (area 320), the third set (area 330), and the fourth set (area 340) are classified as a third horizontal-range sharing group.

Returning to FIG. 5, horizontally grouping portion 65 outputs, for each horizontal-range sharing group, the plurality of sets included in the group, to vertical size determining portion 67. Here, for the first horizontal-range sharing group, the first set (area 310), the fifth set (area 350), and the sixth set (area 360) are output. For the second horizontal-range sharing group, the second set (area 320), the fifth set (area 350), and the sixth set (area 360) are output. For the third horizontal-range sharing group, the second set (area 320), the third set (area 330), and the fourth set (area 340) are output.

Vertical size determining portion 67 receives a plurality of sets for each horizontal-range sharing group from horizontally grouping portion 65, and receives a screen size from screen size acquiring portion 53. For each horizontal-range sharing group, vertical size determining portion 67 determines a vertical size of any vertically variable set that is included in the sets classified in the relevant horizontal-range sharing group, on the basis of a vertical size of any vertically fixed set included in the group and a vertical size of the screen size. More specifically, for a vertically fixed set, its vertical size is determined to be the vertical size that has been determined for the area of that set by the layout information. The vertical size of the vertically fixed set is subtracted from the vertical size of the screen size, to obtain a remainder. Then, the vertical size of the vertically variable set is determined to be a value obtained by adding the remainder to the minimum vertical size that has been determined for the area of that set by the layout information. In the case where there is more than one vertically variable set, vertical size determining portion 67 distributes the remainder to the plurality of vertically variable sets in accordance with their priorities. For example, suppose that there are a first vertically variable set and a second vertically variable set, and that the minimum size of the first vertically variable set is MVL1, the minimum size of the second vertically variable set is MVL2, the remainder is RVL, the priority of the first vertically variable set is 1, and the priority of the second vertically variable set is 2. Then, the remainder RVL is distributed to the first and second vertically variable sets in the ratio of 2:1. Therefore, the vertical size of the first vertically variable set becomes MVL1+RVL×⅔. The vertical size of the second vertically variable set becomes MVL2+RVL×⅓. After having determined the vertical sizes of the plurality of sets, vertical size determining portion 67 outputs the vertical sizes of the respective sets included in the reference screen information, to converted area disposing portion 69.

Converted area disposing portion 69 receives from horizontal size determining portion 63 the horizontal sizes of the respective sets included in the reference screen information, and receives from vertical size determining portion 67 the vertical sizes of the respective sets included in the reference screen information.

Converted area disposing portion 69 determines sizes of converted areas corresponding respectively to the plurality of sets included in the reference screen information. Specifically, for each of the converted areas corresponding respectively to the plurality of sets, its horizontal size is determined to be the horizontal size of the relevant set input from horizontal size determining portion 63, and its vertical size is determined to be the vertical size of the relevant set input from vertical size determining portion 67.

Converted area disposing portion 69 disposes a plurality of converted areas corresponding respectively to the plurality of sets, in the display screen having the screen size input from screen size acquiring portion 53, in accordance with the positional information included in the layout information. Specifically, for each of the plurality of sets, the converted area corresponding thereto is disposed in the display screen, in the position that is determined by the positional information of that set. This ensures that the positional relationships between the converted areas corresponding respectively to the plurality of sets become identical to the positional relationships between the corresponding areas within the reference screen. Converted area disposing portion 69 outputs the display screen, with the converted areas for the plurality of sets disposed therein, to component disposing portion 57.

Component disposing portion 57 receives reference screen information from reference screen information acquiring portion 51, and receives a display screen with converted areas for respective sets disposed therein, from converted area disposing portion 69. Component disposing portion 57 disposes, in the display screen, a plurality of components included in the reference screen information, and outputs the display screen with the components disposed therein, to display screen transmitting portion 95. Specifically, for each of the one or more sets, component disposing portion 57 disposes, in the converted area corresponding to that set within the display screen, one or more components that have been classified in the relevant set from among the components included in the reference screen information. Component disposing portion 57 disposes each of the plurality of components, in a size that has been determined by the relevant component. The components include an area in which a setting item is displayed, an area in which a setting value corresponding to the setting item is displayed, and a button to which a command is assigned. Thus, some components may have characters displayed therein. If such a component is reduced in size, the characters may become barely readable. In the case where the component is a button, a user may designate the button with his/her finger. If such a component is reduced in size, the area to be designated by a user will become too small, which will lead to a user operation error such as designating two buttons at the same time. In view of the foregoing, when disposing the components, component disposing portion 57 refrains from reducing them in size. Rather, component disposing portion 57 disposes the components in the same sizes as those within the reference screen that have been determined in the reference screen information. Here, the size is represented in pixels. Alternatively, the size may be represented in centimeters, for example.

On the other hand, the converted area for each of the sets disposed in the display screen may be reduced in size as compared to the corresponding area in the setting screen. With the converted area reduced in size as compared to the area in the setting screen, there may be a case where only some of the components included in the corresponding set can be disposed in the converted area, or only a part of one component included in the corresponding set can be disposed in the converted area.

Component disposing portion 57 includes a display switching command assigning portion 71 and a scroll command assigning portion 73. In the case where it is not possible to dispose, in a converted area, all the components classified in the corresponding set at the same time, display switching command assigning portion 71 disposes at least one of the components classified in the set in the converted area, and also assigns to the converted area a display switching command for disposing the remaining component(s) in the converted area in place of the formerly disposed component(s). For example, the setting screen shown in FIG. 6 includes area 330 for the third set, and the third set includes three components 331 to 333. The converted area within the display screen corresponding to area 330 for the third set may have a space in which only one of the three components 331 to 333 can be disposed. In this case, display switching command assigning portion 71 disposes component 331 in the converted area, and adds to the converted area a display switching command for displaying the remaining components 332 and 333 in place of component 331.

The display switching command is, for example, a command to display component 332, in place of component 331, when a user designates the converted area, and display component 333, in place of component 332, when the user designates the converted area again, and then display component 331, in place of component 333, when the user designates the converted area again. In the case where commands have been assigned to the respective components 331 to 333, the user operation of designating the converted area is made to be an operation which is different from a user operation of inputting a designation regarding the command assigned to any of the components. For example, when the user operation of inputting a designation regarding a command assigned to one of the components is an operation of touching a button, then the user operation of designating the converted area may be a flick operation of moving a finger while designating the converted area. Further, the component to be displayed next may be changed in accordance with the direction of the flick operation. For example, in the case where a right flick is accepted in the state where component 331 is being displayed, component 332 may be displayed in place of component 331. In the case where a left flick is accepted in the state where component 331 is being displayed, component 333 may be displayed in place of component 331.

In the case where the converted area is not large enough to dispose a whole of one component classified in the corresponding set, scroll command assigning portion 73 disposes a displayed part, which is part of the component classified in the set, in the converted area, and also assigns to the converted area a scroll command for disposing a yet-to-be displayed part, other than the displayed part of the component, in the converted area in place of the displayed part. For example, the setting screen shown in FIG. 6 includes area 310 for the first set, and the first set includes one component 311. Component 311 includes 68 characters in total, including spaces, of "YOU CAN CHANGE THE NUMBER OF COPIES USING TEN-KEY PAD AND CLEAR KEY." The converted area within the display screen corresponding to area 310 for the first set may be reduced in size in the horizontal direction and, thus, only 50 characters, for example, can be displayed therein. In this case, scroll command assigning portion 73 displays the first 50 characters in the character string of 68 characters in the converted area, and also assigns to the converted area a scroll command for scrolling the characters to be displayed. The scroll command is a command to display "YOU CAN CHANGE THE NUMBER OF COPIES USING TEN-KEY" first, then replace the first character "Y" with the first character "P" of the yet-to-be displayed characters to thereby display "OU CAN CHANGE THE NUMBER OF COPIES USING TEN-KEY P", then repeat the same process to display "U CAN CHANGE THE NUMBER OF COPIES USING TEN-KEY PA", . . . , and finally display "NUMBER OF COPIES USING TEN-KEY PAD AND CLEAR KEY." The scroll command is executed when a display screen is displayed. The command displays 50 characters out of the character string of 68 characters, and changes the display content 18 times by replacing one character at a time. In this manner, the entire character string of 68 characters in total, i.e. "YOU CAN CHANGE THE NUMBER OF COPIES USING TEN-KEY PAD AND CLEAR KEY.", can be displayed within a prescribed time.

FIG. 10 shows exemplary sizes of converted areas. Here, with the setting screen shown in FIG. 6 as a reference screen, the sizes of the converted areas within a display screen having 1200 pixels in the horizontal direction and 900 pixels in the vertical direction are shown. The horizontal sizes will be described first. The first vertical-range sharing group includes the first and second sets, and "size changeability" in the horizontal direction of the second set is set to be "fixed". Therefore, the horizontal size of the converted area corresponding to the second set is 600 pixels. For the first set, remaining in the first vertical-range sharing group, "size changeability" in the horizontal direction is set to be "variable". Accordingly, the horizontal size of the converted area corresponding to the first set becomes 600 pixels.

The second vertical-range sharing group includes the third and fifth sets, and "size changeability" in the horizontal direction of the third set is set to be "fixed". Therefore, the horizontal size of the converted area corresponding to the third set is 200 pixels. For the fifth set, remaining in the second vertical-range sharing group, "size changeability" in the horizontal direction is set to be "variable". Accordingly, the horizontal size of the converted area corresponding to the fifth set becomes 1000 pixels.

The third vertical-range sharing group includes the fourth and sixth sets, and "size changeability" in the horizontal direction of of the fourth set is set to be "fixed". Therefore, the horizontal size of the converted area corresponding to the fourth set is 200 pixels. For the sixth set, remaining in the third vertical-range sharing group, "size changeability" in the horizontal direction is set to be "variable". Accordingly, the horizontal size of the converted area corresponding to the sixth set becomes 1000 pixels.

The vertical sizes will now be described. The first horizontal-range sharing group includes the first, fifth, and sixth sets, and "size changeability" in the vertical direction is set to be "fixed" for the first and sixth sets. Therefore, the vertical size of the converted area corresponding to the first set is 200 pixels, and the vertical size of the converted area corresponding to the sixth set is 300 pixels. For the fifth set, remaining in the first horizontal-range sharing group, "size changeability" in the vertical direction is set to be "variable". Accordingly, the vertical size of the converted area corresponding to the fifth set becomes 400 pixels.

The second horizontal-range sharing group includes the second, fifth, and sixth sets, and "size changeability" in the vertical direction is set to be "fixed" for the second and sixth sets. Therefore, the vertical size of the converted area corresponding to the second set is 200 pixels, and the vertical size of the converted area corresponding to the sixth set is 300 pixels. For the fifth set, remaining in the second horizontal-range sharing group, "size changeability" in the vertical direction is set to be "variable". Accordingly, the vertical size of the converted area corresponding to the fifth set becomes 400 pixels. This vertical size is the same as that determined for the fifth set in the first horizontal-range sharing group, so the vertical size of the converted area corresponding to the fifth set is set to 400 pixels. In the case where the size calculated in relation to the first horizontal-range sharing group and the size calculated in relation to the second horizontal-range sharing group differ from each other, the smaller size can be adopted as the vertical size of the converted area corresponding to the fifth set.

The third horizontal-range sharing group includes the second, third, and fourth sets, and "size changeability" in the vertical direction of the second set is set to be "fixed". Therefore, the vertical size of the converted area corresponding to the second set is 200 pixels. For the third and fourth sets, remaining in the third horizontal-range sharing group, "size changeability" in the vertical direction is set to be "variable". Accordingly, the remainder RVL obtained by subtracting, from the vertical size (900 pixels) of the display screen, the vertical size (200 pixels) of the converted area corresponding to the second set and the minimum sizes in the vertical direction of the third and fourth sets becomes 400 pixels. This remainder RVL of 400 pixels is distributed to the third and fourth sets. In this case, the priority in the vertical direction of the third set is "3", and the priority in the vertical direction of the fourth set is "4", so the third set is higher in priority than the fourth set. Further, the minimum size MVL1 of the third set (vertically variable set) is 200 pixels, and the minimum size MVL2 of the fourth set (vertically variable set) is 100 pixels. Thus, from the computational expression of MVL1+RVL×⅔, the vertical size of the third set becomes 466 pixels, and from the computational expression of MVL2+RVL×⅓, the vertical size of the fourth set becomes 233 pixels. It should be noted that the fractional portion of the number is dropped.

FIG. 11 shows an exemplary display screen. Referring to FIG. 11, a display screen 300A includes converted areas 310A to 360A, which have been obtained by converting the areas 310 to 360 corresponding respectively to the first to sixth sets in setting screen 300 shown in FIG. 6 to the sizes of the converted areas shown in FIG. 10. The relative positional relationships between the converted areas 310A to 360A within the display screen 300A are identical to the relative positional relationships between the areas 310 to 360 within the setting screen 300.

Converted area 310A corresponding to the first set has its vertical size identical to that of area 310 included in setting screen 300, its horizontal size reduced from that of area 310, and includes a part of the character string constituting the first component included in the first set. A scroll command is assigned to converted area 310A. In practice, a part of the character string of the first component is displayed sequentially, with the characters displayed being changed little by little, so that the entire character string of the first component is displayed within a prescribed time. Converted area 320A corresponding to the second set has its size identical to that of area 320 in setting screen 300.

Converted area 330A corresponding to the third set has its horizontal size identical to that of area 330 included in setting screen 300, its vertical size reduced from that of area 330, and includes third component 331 and fourth component 332 out of the third to fifth components. A display switching command is assigned to converted area 330A. When a user designates converted area 330A, fifth component 333 remaining in the third set is displayed in place of third component 331.

Converted area 340A corresponding to the fourth set has its horizontal size identical to that of area 340 included in setting screen 300, its vertical size reduced from that of area 340, and includes sixth component 341 and seventh component 342 out of sixth to eighth components 341, 342, and 343. A display switching command is assigned to converted area 340A. When a user designates converted area 340A, eighth component 343 remaining in the fourth set is displayed in place of sixth component 341.

Converted area 350A corresponding to the fifth set has its vertical size and horizontal size both reduced from those of area 350 included in setting screen 300, and includes a part of the ninth component. A scroll command is assigned to converted area 350A. In practice, a part of an image constituting the ninth component is displayed sequentially, with the part displayed being changed little by little, so that the entire image of the ninth component is displayed within a prescribed time.

Converted area 360A corresponding to the sixth set has its vertical size identical to that of area 360 included in setting screen 300, its horizontal size reduced from that of area 360, and includes tenth to fourteenth components 361 to 365 out of tenth to sixteenth components 361 to 367. A display switching command is assigned to converted area 360A. Each time a user designates converted area 360A, fifteenth component 366 and sixteenth component 367 remaining in the sixth set are displayed in turn.

Figure 12:
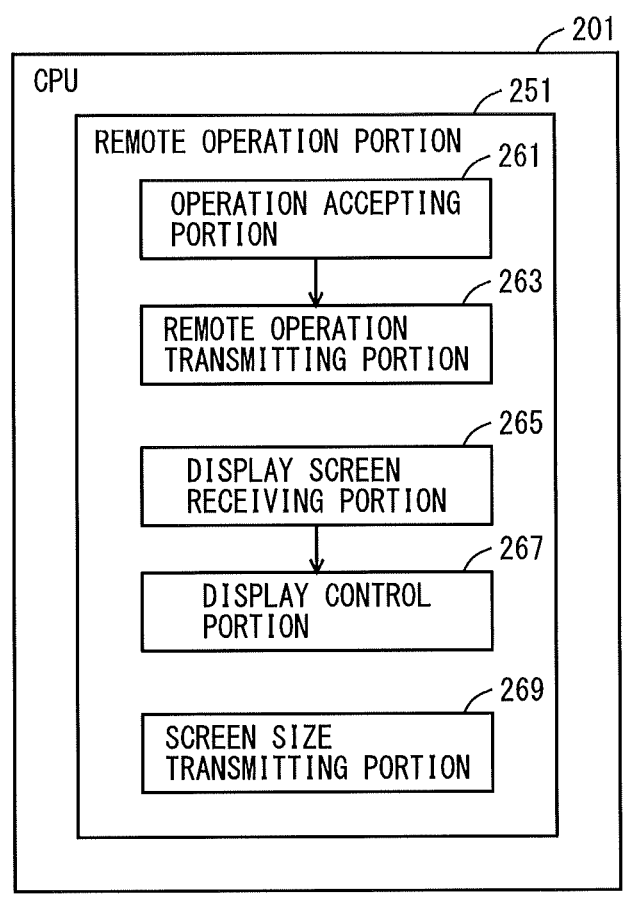
FIG. 12 is a block diagram showing, by way of example, the functions of a CPU included in the mobile information device according to the present embodiment.

FIG. 12 is a block diagram showing, by way of example, the functions of a CPU included in the mobile information device according to the present embodiment. The functions shown in FIG. 12 are formed in CPU 201 included in mobile information device 200 as CPU 201 executes a remote operation program stored in flash memory 203 or CD-ROM 211A. Referring to FIG. 12, CPU 201 includes a remote operation portion 251 which remotely controls MFP 100. Remote operation portion 251 includes: an operation accepting portion 261 which accepts an operation by a user; a remote operation transmitting portion 263; a display screen receiving portion 265 which receives a display screen; a display control portion 267 which controls display portion 206; and a screen size transmitting portion 269.

Display screen receiving portion 265 controls wireless LAN I/F 208 to receive a display screen from MFP 100. When a user operates operation portion 207 and inputs an instruction to remotely operate MFP 100, display screen receiving portion 265 controls wireless LAN I/F 208 to transmit a connection request to MFP 100, and establishes a communication path with MFP 100. When the communication path is established with MFP 100, display screen receiving portion 265 controls wireless LAN I/F 208 to receive the display screen transmitted from MFP 100. Display screen receiving portion 265 outputs the received display screen to display control portion 267.

In response to an input of the display screen from display screen receiving portion 265, display control portion 267 displays the display screen on display portion 206. The display screen includes a plurality of converted areas, and one or more components disposed in the converted areas. A display switching command or a scroll command may have been assigned to some of the converted areas. As for the converted area to which a scroll command has been assigned, display control portion 267 displays a plurality of characters included in the scroll command in succession, in place of the characters disposed in the converted area. For example, suppose that a scroll command includes a character string of 68 characters in total of "YOU CAN CHANGE THE NUMBER OF COPIES USING TEN-KEY PAD AND CLEAR KEY.", and that 50 characters can be displayed in the converted area. Then, display control portion 267 displays the first 50 characters in the character string of 68 characters in the converted area first, and sequentially changes a part of the characters being displayed. Specifically, display control portion 267 displays "YOU CAN CHANGE THE NUMBER OF COPIES USING TEN-KEY" first, then replaces the first character "Y" with the first character "P" of the yet-to-be displayed characters to thereby display "OU CAN CHANGE THE NUMBER OF COPIES USING TEN-KEY P", then repeats the same process to display "U CAN CHANGE THE NUMBER OF COPIES USING TEN-KEY PA", . . . , and finally displays "NUMBER OF COPIES USING TEN-KEY PAD AND CLEAR KEY." As such, 50 characters out of the character string of 68 characters are displayed at a time, and the display content is changed 18 times, with one character replaced each time. In this manner, the entire character string of 68 characters in total, i.e. "YOU CAN CHANGE THE NUMBER OF COPIES USING TEN-KEY PAD AND CLEAR KEY.", is displayed within a prescribed time.

As for the converted area to which a display switching command has been assigned, display control portion 267 disposes at least one of the plurality of components included in the display switching command in the converted area, and then disposes the remaining component(s) in the converted area in place of the formerly disposed component(s). For example, suppose that a display switching command includes three components and that the converted area has a space in which only one component out of the three components can be disposed. In this case, display control portion 267 displays one of the three components in the converted area. Thereafter, when a user operation of designating the converted area is detected, display control portion 267 displays one of the two components that have not been displayed yet, in place of the then displayed component. When a user operation of designating the converted area is detected again, display control portion 267 displays the component that has not been displayed yet, in place of the then displayed component.

In the case where commands have been assigned to the three components included in the display switching command, display control portion 267 is configured to detect an operation which is different from the operation for inputting a designation regarding the command assigned to any of those components. For example, when a designation regarding a command assigned to one of the components is input through an operation of touching a button, then the component to be displayed in the converted area is switched when a flick operation of moving a finger while designating the converted area is detected. The component to be displayed next may be changed in accordance with the direction of the flick operation.

In the case where wireless LAN I/F 208 receives a screen size transmission request from MFP 100, screen size transmitting portion 269 transmits the screen size of display portion 206 to MFP 100.

Operation accepting portion 261 accepts a remote operation that a user inputs to operation portion 207 in accordance with the display screen displayed on display portion 206. The remote operation includes a setting operation for setting a setting value, a screen switching operation for changing a setting screen, and an execution instructing operation for instructing execution of a process. When accepting a remote operation, operation accepting portion 261 outputs the accepted remote operation to remote operation transmitting portion 263. Remote operation transmitting portion 263 controls wireless LAN I/F 208 to transmit the remote operation to MFP 100.

Figure 13:
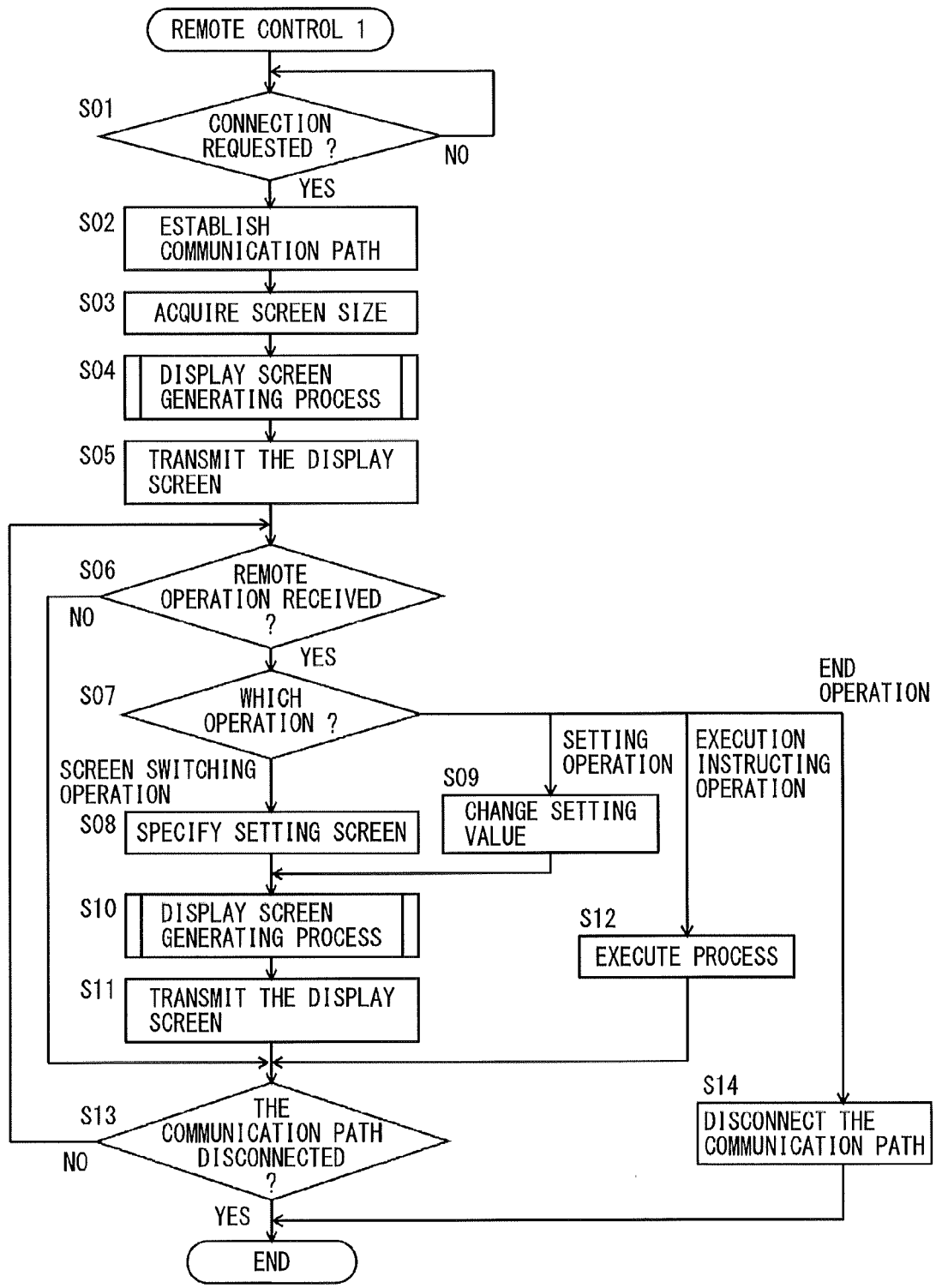
FIG. 13 is a flowchart illustrating an exemplary flow of a remote control process.

FIG. 13 is a flowchart illustrating an exemplary flow of a remote control process. The remote control process is carried out by CPU 111 included in MFP 100 as CPU 111 executes a remote control program stored in ROM 113, HDD 115, or CD-ROM 118.

Referring to FIG. 13, CPU 111 determines whether a connection request has been received (step S01). CPU 111 determines whether communication I/F portion 112 has received a connection request from the outside. CPU 111 is in a standby mode until a connection request is received, and once the connection request is received, the process proceeds to step S02. It is here assumed that a connection request is received from mobile information device 200.

In step S02, CPU 111 establishes a communication path with mobile information device 200. CPU 111 then acquires a screen size (step S03). Specifically, CPU 111 acquires, via communication I/F portion 112, the screen size from mobile information device 200 which is the remote operation device. In the following step S04, CPU 111 carries out a display screen generating process, and the process proceeds to step S05. The display screen generating process carried out in step S04 is a process of generating a display screen corresponding to the setting screen which has been set to the default. The display screen generating process will be described in detail later. In step S05, CPU 111 transmits the display screen generated in step S04, via communication I/F portion 112, to mobile information device 200 which is the remote operation device. The process then proceeds to step S06.

In step S06, CPU 111 determines whether a remote operation has been received. If communication I/F portion 112 has received a remote operation from mobile information device 200 which is the remote operation device, the process proceeds to step S07; otherwise, the process proceeds to step S13. In step S07, the process branches in accordance with the remote operation. If the remote operation is a screen switching operation of switching the display screen, the process proceeds to step S08. If the remote operation is a setting operation of setting a setting value, the process proceeds to step S09. If the remote operation is an execution instructing operation of instructing execution of a process, the process proceeds to step S12. If the remote operation is an end operation of terminating the remote control, the process proceeds to step S14.

In step S08, CPU 111 specifies a setting screen, and the process proceeds to step S10. In step S09, CPU 111 changes the setting value to the value specified by the setting operation, and the process proceeds to step S10. In step S10, CPU 111 carries out a display screen generating process, and the process proceeds to step S11. The display screen generating process carried out in step S10 is a process of generating a display screen corresponding to the setting screen specified in step S08 or a display screen corresponding to the setting screen to which the setting value set in step S09 has been reflected. The display screen generating process will be described in detail later. In step S11, CPU 111 transmits the display screen generated in step S10, via communication I/F portion 112, to mobile information device 200 which is the remote operation device. The process then proceeds to step S13.

In step S12, CPU 111 executes the process specified by the execution instructing operation, in accordance with the setting value that has been set at that time point, and the process proceeds to step S13. In step S13, CPU 111 determines whether the communication path established in step S02 has been disconnected. The communication path may be disconnected by mobile information device 200 which is the remote operation device, or it may be disconnected when communication becomes impossible due to increased radio noise. If the communication path has not been disconnected, the process returns to step S06. If the communication path has been disconnected, the process is terminated. In step S14, CPU 111 disconnects the communication path established in step S02, and the process is terminated.

Figure 14:
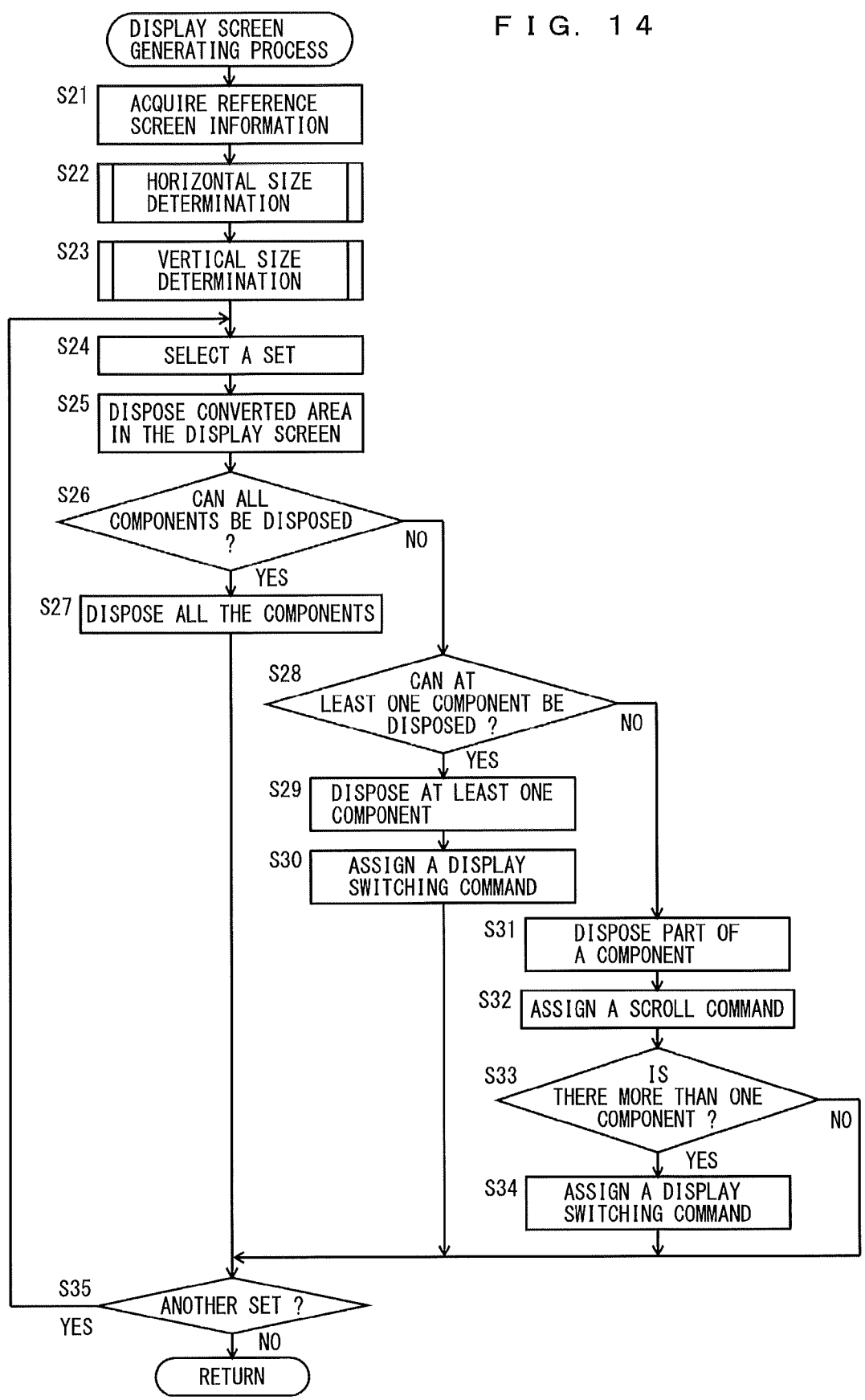
FIG. 14 is a flowchart illustrating an exemplary flow of a display screen generating process.

FIG. 14 is a flowchart illustrating an exemplary flow of a display screen generating process. The display screen generating process is carried out in step S04 or S10 in the remote control process shown in FIG. 13. Prior to step S04 or S10 in FIG. 13, the setting screen as a process target has been specified, and mobile information device 200 which is the remote operation device has been specified in step S02.

Referring to FIG. 14, CPU 111 acquires reference screen information (step S21). Specifically, CPU 111 reads, from a plurality of pieces of reference screen information stored in HDD 115, the reference screen information corresponding to the setting screen that has been set as the process target. The reference screen information includes a plurality of components classified into one or more sets, and layout information for disposing the plurality of components in the reference screen. The layout information includes, for each of the one or more sets, positional information which indicates a relative positional relationship, within the reference screen, between an area corresponding to the set and areas corresponding respectively to the other one or more sets. The layout information also includes, for each of the one or more sets, a size of the area corresponding to the set, and shrinkability information for each of the vertical and horizontal directions of the relevant area. For the set determined to be shrinkable, the layout information further includes a minimum display size and a priority for each of the vertical and horizontal directions.

CPU 111 carries out a horizontal size determination process (step S22) and a vertical size determination process (step S23), and the process proceeds to step S24. The horizontal size determination process, which will be described in detail later, is a process of determining horizontal sizes of the converted areas corresponding respectively to the one or more sets included in the reference screen information. The vertical size determination process, which will be described in detail later, is a process of determining vertical sizes of the converted areas corresponding respectively to the one or more sets included in the reference screen information.

In step S24, CPU 111 selects one set, from among the one or more sets included in the reference screen information, as a process target. In the following step S25, CPU 111 disposes, in the display screen, the converted area corresponding to the set selected as the process target. The display screen has a screen size that has been acquired from mobile information device 200 which is the remote operation device. The horizontal size of the converted area is the size determined in step S22 for the set selected as the process target. The vertical size of the converted area is the size determined in step S23 for the set selected as the process target. The position within the display screen where the converted area is to be disposed is determined by the positional information included in the reference screen information. The positional information included in the reference screen information indicates the relative positional relationship of the relevant area to the areas corresponding to the other sets. This ensures that the positional relationships between the one or more converted areas corresponding respectively to the one or more sets included in the reference screen information become identical to the positional relationships between the one or more areas within the reference screen.

In step S26, CPU 111 determines whether all of the one or more components included in the set selected as the process target can be disposed in the converted area. The size of each component has been determined by the reference screen information. On the other hand, the horizontal and vertical sizes of the converted area have been determined, in steps S22 and S23, to be the values changed on the basis of the area size in the reference screen. The converted area may have been reduced in size from the corresponding area in the reference screen, in which case the resultant converted area may not be large enough to dispose therein all of the one or more components that were disposed in the corresponding area in the reference screen. If it is possible to dispose all of the one or more components in the converted area, the process proceeds to step S27; otherwise, the process proceeds to step S28. In step S27, CPU 111 disposes, in the converted area, all of the one or more components included in the set selected as the process target, and the process proceeds to step S35.

In step S28, CPU 111 determines whether it is possible to dispose at least one component. If it is determined that at least one component can be disposed, the process proceeds to step S29; otherwise, the process proceeds to step S31. In step S29, CPU 111 disposes, in the converted area, at least one component out of the one or more components included in the set selected as the process target, and the process proceeds to step S30. In step S30, CPU 111 assigns a display switching command to the converted area, and the process proceeds to step S35.

The process proceeds to step S31 in the case where it is not possible to dispose one or more components in the converted area. In step S31, CPU 111 disposes a part of a component in the converted area, and the process proceeds to step S32. Here, when the component includes a character string, "a part of the component" means a part of the character string. When the component includes an image, "a part of the component" means a part of the image. In step S32, CPU 111 assigns a scroll command to the converted area, and the process proceeds to step S33. In step S33, CPU 111 determines whether two or more components are included in the set selected as the process target. If so, the process proceeds to step S34; otherwise, the process proceeds to step S35, with step S34 being skipped. In step S34, CPU 111 assigns a display switching command to the converted area, and the process proceeds to step S35.

In step S35, CPU 111 determines whether there is a set that has not been selected as a process target yet. If so, the process returns to step S24; otherwise, the process returns to the remote control process.

Figure 15:
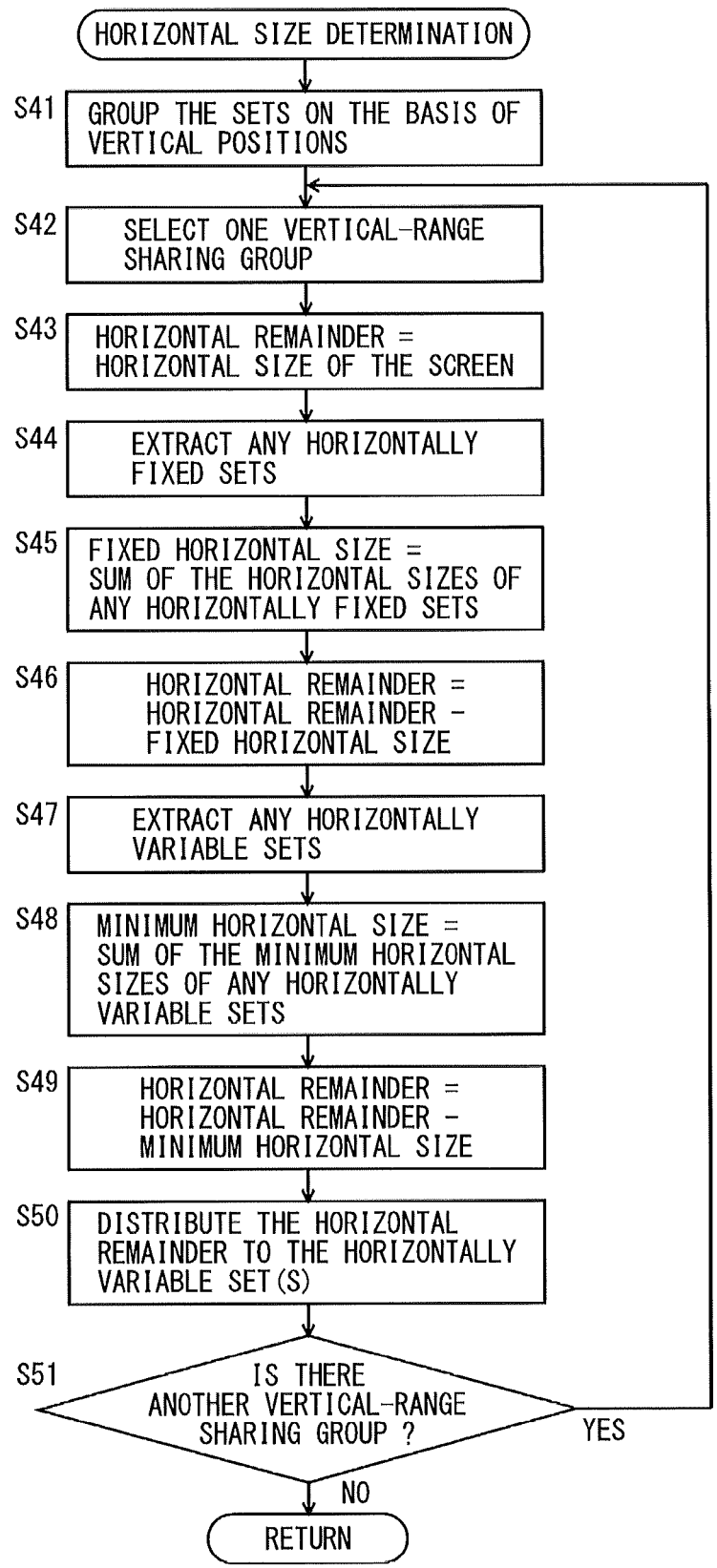
FIG. 15 is a flowchart illustrating an exemplary flow of a horizontal size determination process.

FIG. 15 is a flowchart illustrating an exemplary flow of a horizontal size determination process. The horizontal size determination process is carried out in step S22 in the display screen generating process shown in FIG. 14. In FIG. 14, prior to step S22, the reference screen information has been acquired (step S21), and the screen size of the display screen has been acquired (step S03 in FIG. 13).

Referring to FIG. 15, CPU 111 groups the sets in accordance with the vertical positions of the corresponding areas, on the basis of the area information included in the reference screen information. Specifically, two or more sets whose areas at least partially share a common range in the vertical direction are classified as a same vertical-range sharing group (step S41). In this manner, one or more vertical-range sharing groups are generated. In the following step S42, CPU 111 selects one of the generated vertical-range sharing group(s) as a process target, and the process proceeds to step S43.

In step S43, CPU 111 sets a horizontal remainder, which is a variable, to the horizontal size of the display screen. CPU 111 then extracts, from among a plurality of sets included in the vertical-range sharing group selected as the process target in step S42, any horizontally fixed sets having its horizontal size fixed (step S44). In step S45, CPU 111 sets a fixed horizontal size, which is a variable, to the sum of the horizontal sizes of any horizontally fixed sets. In the following step S46, CPU 111 sets the horizontal remainder, which is a variable, to the value obtained by subtracting the fixed horizontal size from the horizontal remainder.

In step S47, CPU 111 extracts, from among the plurality of sets included in the vertical-range sharing group selected as the process target in step S42, any horizontally variable sets having its horizontal size variable. CPU 111 then sets a minimum horizontal size, which is a variable, to the sum of the minimum horizontal sizes of any horizontally variable sets (step S48). Further, CPU 111 sets the horizontal remainder to the value obtained by subtracting the minimum horizontal size from the horizontal remainder (step S49). CPU 111 then distributes the horizontal remainder to any horizontally variable sets, on the basis of their priorities (step S50). Here, the horizontal size of a horizontally variable set is determined to be a value obtained by adding, to the minimum horizontal size determined for the area of that set by the layout information in the reference screen information, the size of the remainder distributed to that set. In the case where there are two or more horizontally variable sets, the remainder is distributed to the horizontally variable sets, in accordance with their priorities. For example, suppose that there are a first horizontally variable set and a second horizontally variable set, and that the minimum size of the first horizontally variable set is MHL1, the minimum size of the second horizontally variable set is MHL2, the remainder is RHL, the priority of the first horizontally variable set is 1, and the priority of the second horizontally variable set is 2. Then, the remainder RHL is distributed to the first and second horizontally variable sets in the ratio of 2:1. Therefore, the horizontal size of the first horizontally variable set becomes MHL1+RHL×⅔. The horizontal size of the second horizontally variable set becomes MHL2+RHL×⅓.

In step S51, CPU 111 determines whether there is a vertical-range sharing group that has not been processed yet. If so, the process returns to step S42; otherwise, the process returns to the display screen generating process.

Figure 16:
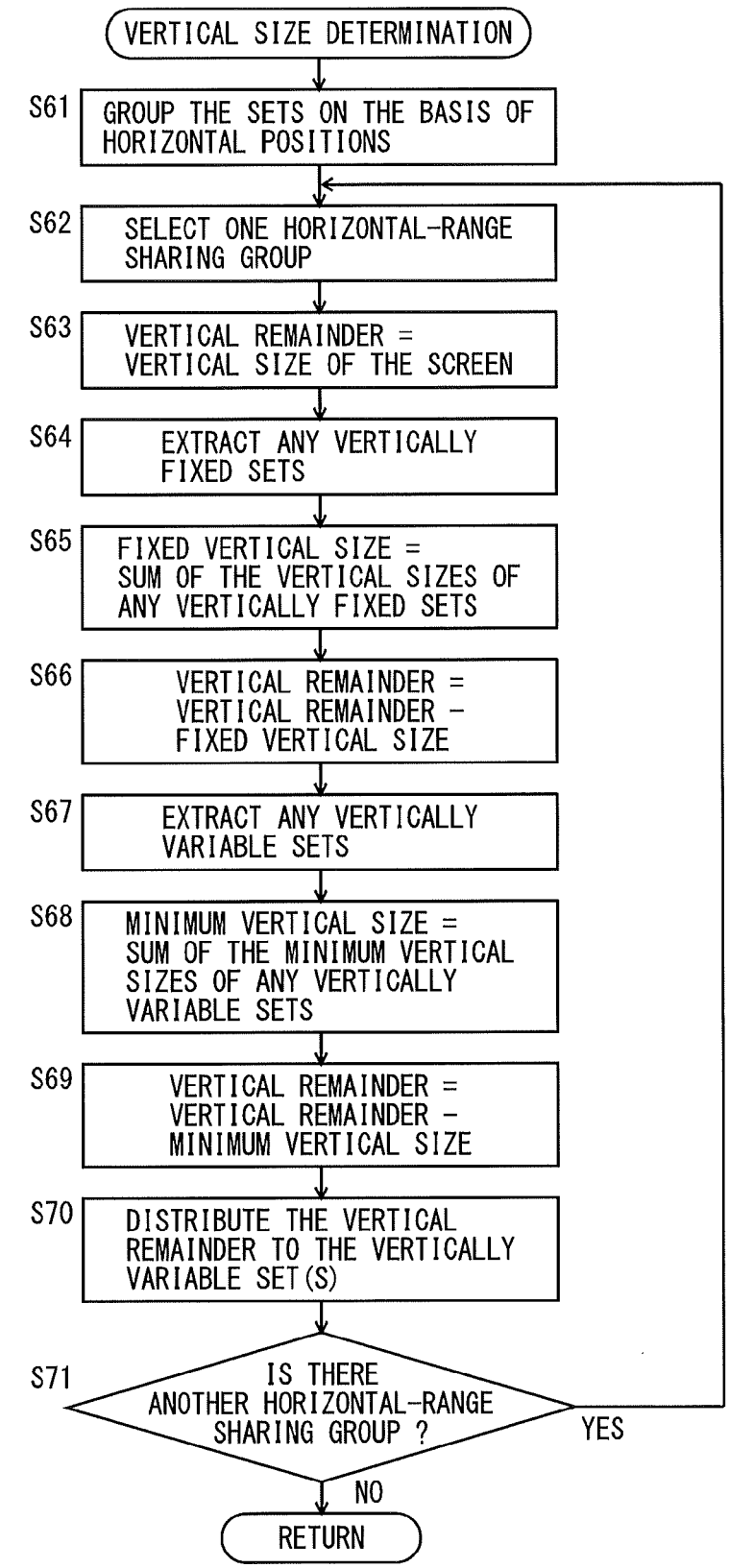
FIG. 16 is a flowchart illustrating an exemplary flow of a vertical size determination process.

FIG. 16 is a flowchart illustrating an exemplary flow of a vertical size determination process. The vertical size determination process is carried out in step S23 in the display screen generating process shown in FIG. 14. In FIG. 14, prior to step S23, the reference screen information has been acquired (step S21), and the screen size of the display screen has been acquired (step S03 in FIG. 13).

Referring to FIG. 16, CPU 111 groups the sets in accordance with the horizontal positions of the corresponding areas, on the basis of the area information included in the reference screen information. Specifically, two or more sets whose areas at least partially share a common range in the horizontal direction are classified as a same horizontal-range sharing group (step S61). In this manner, one or more horizontal-range sharing groups are generated. In the following step S62, CPU 111 selects one of the generated horizontal-range sharing group(s) as a process target, and the process proceeds to step S63.

In step S63, CPU 111 sets a vertical remainder, which is a variable, to the vertical size of the display screen. CPU 111 then extracts, from among a plurality of sets included in the horizontal-range sharing group selected as the process target in step S62, any vertically fixed sets having its vertical size fixed (step S64). In step S65, CPU 111 sets a fixed vertical size, which is a variable, to the sum of the vertical sizes of any vertically fixed sets. In the following step S66, CPU 111 sets the vertical remainder, which is a variable, to the value obtained by subtracting the fixed vertical size from the vertical remainder.

In step S67, CPU 111 extracts, from among the plurality of sets included in the horizontal-range sharing group selected as the process target in step S62, any vertically variable sets having its vertical size variable. CPU 111 then sets a minimum vertical size, which is a variable, to the sum of the minimum vertical sizes of any vertically variable sets (step S68). Further, CPU 111 sets the vertical remainder to the value obtained by subtracting the minimum vertical size from the vertical remainder (step S69). CPU 111 then distributes the vertical remainder to any vertically variable sets, on the basis of their priorities (step S70). Here, the vertical size of a vertically variable set is determined to be a value obtained by adding, to the minimum vertical size determined for the area of that set by the layout information in the reference screen information, the size of the remainder distributed to that set. In the case where there are two or more vertically variable sets, the remainder is distributed to the vertically variable sets, in accordance with their priorities. For example, suppose that there are a first vertically variable set and a second vertically variable set, and that the minimum size of the first vertically variable set is MVL1, the minimum size of the second vertically variable set is MVL2, the remainder is RVL, the priority of the first vertically variable set is 1, and the priority of the second vertically variable set is 2. Then, the remainder RVL is distributed to the first and second vertically variable sets in the ratio of 2:1. Therefore, the vertical size of the first vertically variable set becomes MVL1+RVL×⅔. The vertical size of the second vertically variable set becomes MVL2+RVL×⅓.

In step S71, CPU 111 determines whether there is a horizontal-range sharing group that has not been processed yet. If so, the process returns to step S62; otherwise, the process returns to the display screen generating process.

Figure 17:
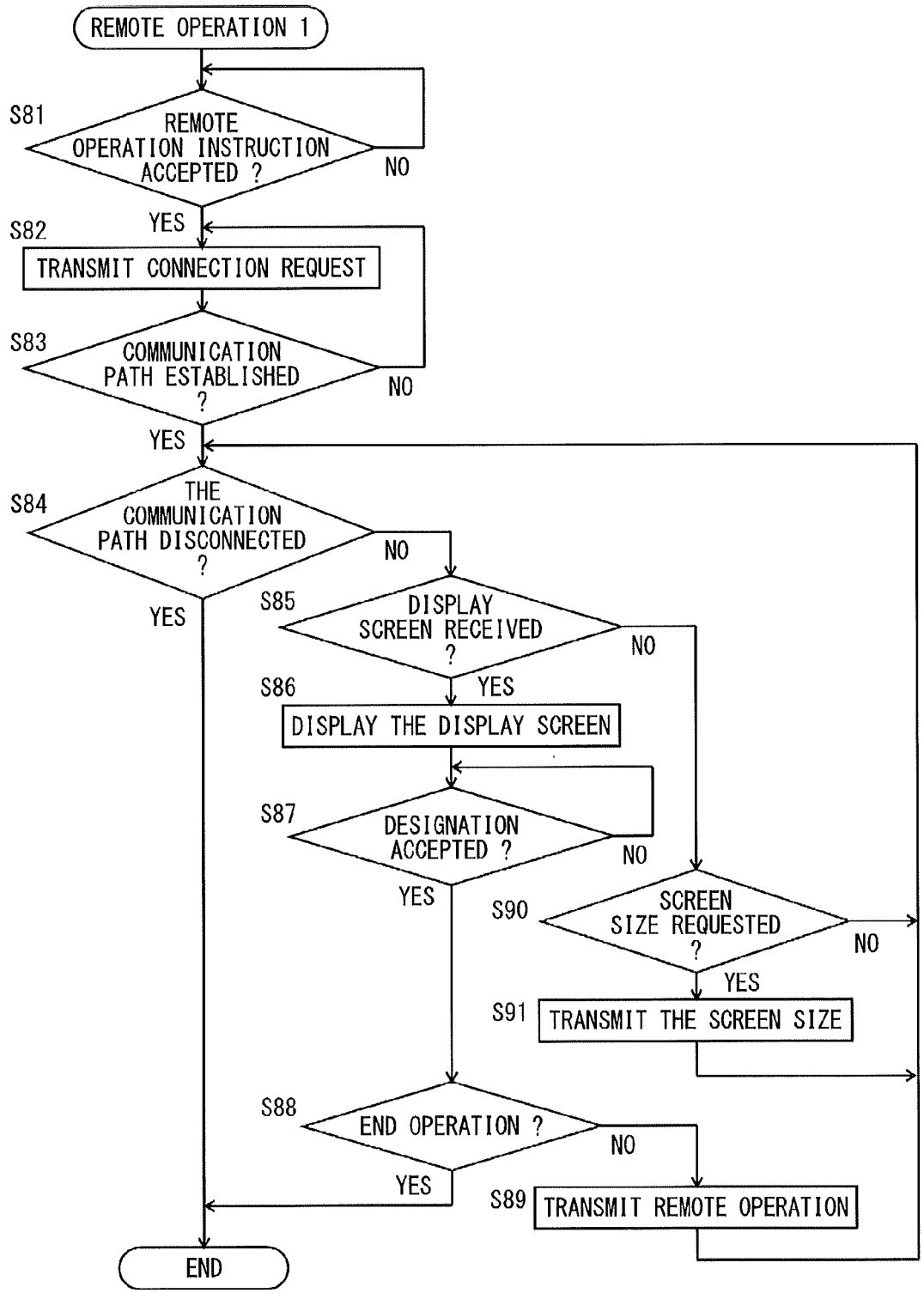
FIG. 17 is a flowchart illustrating an exemplary flow of a remote operation process.

FIG. 17 is a flowchart illustrating an exemplary flow of a remote operation process. The remote operation process is carried out by CPU 201 included in mobile information device 200 as CPU 201 executes a remote operation program stored in flash memory 203 or CD-ROM 211A. Referring to FIG. 17, CPU 201 determines whether a remote operation instruction has been accepted (step S81). The remote operation instruction is accepted when operation portion 207 accepts a remote operation instruction input by a user. CPU 201 is in a standby mode until a remote operation instruction is accepted (NO in step S81), and once the remote operation instruction is accepted (YES in step S81), the process proceeds to step S82.

In step S82, CPU 201 transmits a connection request to MFP 100. Specifically, CPU 201 controls wireless LAN I/F 208 to transmit a connection request for establishing a communication path with MFP 100. CPU 201 then determines whether a communication path has been established (step S83). CPU 201 negotiates with MFP 100 to establish a communication path. Step S82 is repeated until a communication path is established (NO in step S83), and once the communication path is established (YES in step S83), the process proceeds to step S84.

In step S84, CPU 201 determines whether the communication path established in step S83 has been disconnected by MFP 100. If so, the process is terminated; otherwise, the process proceeds to step S85.

In step S85, CPU 201 determines whether a display screen has been received. CPU 201 controls wireless LAN I/F 208 to receive a display screen from MFP 100. If the display screen has been received, the process proceeds to step S86; otherwise, the process proceeds to step S90.

In step S90, CPU 201 determines whether a screen size request has been received. CPU 201 controls wireless LAN I/F 208 to receive a screen size request from MFP 100. If the screen size request has been received, the process proceeds to step S91; otherwise, the process returns to step S84. In step S91, CPU 201 controls wireless LAN I/F 208 to transmit the screen size of display portion 206 to MFP 100. The process then returns to step S84.

In step S86, CPU 201 displays the display screen on display portion 206, and the process proceeds to step S87. In step S87, CPU 201 determines whether a designation has been accepted. If touch panel 207B detects a position designated by a user, the designation is accepted. CPU 201 is in a standby mode until a designation is accepted (NO in step S87), and once the designation is accepted (YES in step S87), the process proceeds to step S88. In step S88, CPU 201 determines whether the accepted designation is an end operation. If it is not the end operation, the process proceeds to step S89. If it is the end operation, the remote operation process is terminated. In step S89, CPU 201 controls wireless LAN I/F 208 to transmit, to MFP 100, the remote operation that is specified by the accepted designation. The process then returns to step S84.

In the above embodiment, a display screen to be displayed in mobile information device 200 was generated on the basis of the reference screen information stored in MFP 100. Alternatively, a display screen to be displayed in MFP 100 may be generated on the basis of the reference screen information stored in MFP 100.

In this case, referring to the block diagram shown in FIG. 5, it may be configured such that: remote operation receiving portion 91 has the function of accepting an operation input by a user to operation portion 163; display screen transmitting portion 95 has the function of displaying the display screen on display portion 161; and screen size acquiring portion 53 has the function of acquiring the screen size of display portion 161.

This configuration allows a plurality of image forming apparatuses with different screen sizes to use the common reference screen information. It is therefore unnecessary to generate a plurality of setting screens respectively for a plurality of image forming apparatuses with different screen sizes. All that is needed is to generate a single type of reference screen information. This can improve the efficiency in developing a setting screen.

As described above, MFP 100 according to the present embodiment is remotely controlled by one of mobile information devices 200, 200A, and 200B, which are remote operation devices. MFP 100 reads, from HDD 115, reference screen information corresponding to a setting screen that is specified by a remote operation received from mobile information device 200, for example. Then, on the basis of the screen size of display portion 206 of mobile information device 200 and the layout information included in the reference screen information, MFP 100 determines, for each of one or more sets, a converted area corresponding to the set in a display screen, and disposes the converted areas corresponding respectively to the one or more sets such that the positional relationships between the plurality of converted areas become identical to the positional relationships between the plurality of areas within the reference screen. MFP 100 then disposes, in the converted area for each set within the display screen, one or more components classified in that set, with their sizes identical to those in the reference screen, to thereby generate the display screen. Here, a plurality of converted areas corresponding respectively to the one or more sets are disposed in the display screen such that the positional relationships between the plurality of converted areas become identical to the positional relationships between the plurality of areas within the reference screen. Therefore, the plurality of components can be disposed in the display screen in the same manner as in the reference screen (setting screen). Further, the one or more components are disposed, in the converted areas, in the same sizes as those within the reference screen. This allows a user to readily recognize the components, thereby avoiding operation errors. Accordingly, it is possible to display, on mobile information device 200, a display screen which looks similar to the setting screen but differs in size from the setting screen, without changing the sizes of the components in the setting screen.

Further, it is unnecessary to design, in MFP 100, the screen to be displayed on mobile information device 200, separately from the setting screen. This can improve the design efficiency.

In the case where a setting screen is to be displayed on display portion 161 in MFP 100, MFP 100 may generate a display screen to be displayed on display portion 161, on the basis of the reference screen information corresponding to the setting screen. This eliminates the need to store the setting screen. All that is needed is to store a single type of reference screen information corresponding to the setting screen. It is unnecessary to prepare a setting screen to be displayed in MFP 100 and a remote operation screen to be displayed on mobile information device 200 separately. This enables effective use of the storage area.

Further, MFP 100 groups any sets, among the one or more sets, having their areas sharing a common range in the vertical direction, into a vertical-range sharing group, and determines a horizontal size of a horizontally variable set, among the sets classified in the vertical-range sharing group, on the basis of a horizontal size of the screen size and a horizontal size of a horizontally fixed set, among the sets classified in that group. MFP 100 also groups any sets, among the one or more sets, having their areas sharing a common range in the horizontal direction, into a horizontal-range sharing group, and determines a vertical size of a vertically variable set, among the sets classified in the horizontal-range sharing group, on the basis of a vertical size of the screen size and a vertical size of a vertically fixed set, among the sets classified in that group. Accordingly, it is readily possible to determine the vertical and horizontal sizes, within the display screen, of the converted areas corresponding respectively to the plurality of sets.

In the case where there are a plurality of sets which are changeable in size in the same direction of horizontal or vertical direction, MFP 100 determines the sizes of the converted areas corresponding respectively to the plurality of sets in the relevant direction, such that the higher the priority of the corresponding set is, the greater the size of the converted area becomes. In this manner, the horizontal and vertical sizes, within the display screen, of the converted areas corresponding respectively to the areas of the plurality of sets can be determined on the basis of the relative positional relationships with the other areas sharing the common ranges in the respective directions.

Further, in the case where a converted area corresponding to a set is not large enough to dispose therein all of the one or more components classified in that set at the same time, MFP 100 disposes at least one component (i.e. displayed component) from among the one or more components in the converted area, and also assigns a display switching command to the converted area. Accordingly, with different component(s) displayed sequentially, all of the one or more components can eventually be displayed.

Furthermore, in the case where a converted area corresponding to a set is not large enough to dispose therein a whole of the component classified in that set, MFP 100 disposes a part (i.e. displayed part) of the component in the converted area, and also assigns a scroll command to the converted area. Accordingly, with different parts of the component displayed sequentially, the whole of the component can eventually be displayed.

Modification

In print system 1 according to the above embodiment, the display screen was generated in MFP 100. A print system 1A according to a modification is configured to generate a display screen in a remote operation device. In the following, print system 1A according to the modification will be described, primarily focusing on the differences from the print system described above.

FIG. 18 is a block diagram showing, by way of example, the functions of a CPU included in the MFP according to the modification. The functions shown in FIG. 18 are formed in CPU 111A included in MFP 100 as CPU 111A executes a remote control program of the modification stored in ROM 113, HDD 115, or CD-ROM 118. Referring to FIG. 18, the functions differ from those shown in FIG. 5 in that display screen transmitting portion 95 has been changed to a reference screen information transmitting portion 95A, and that screen generating portion 83 has been deleted. The other functions are identical to those shown in FIG. 5, and thus, the description thereof will not be repeated here.

When remote operation receiving portion 91 receives a remote operation indicating a screen switching operation from mobile information device 200, remote operation receiving portion 91 outputs screen identification information of the reference screen specified by the screen switching operation and the device identification information of mobile information device 200, to reference screen information transmitting portion 95A.

When the screen identification information and the device identification information are input from remote operation receiving portion 91, reference screen information transmitting portion 95A controls communication I/F portion 112 to return the reference screen information specified by the screen identification information, to mobile information device 200 that is specified by the device identification information.

Figure 19:
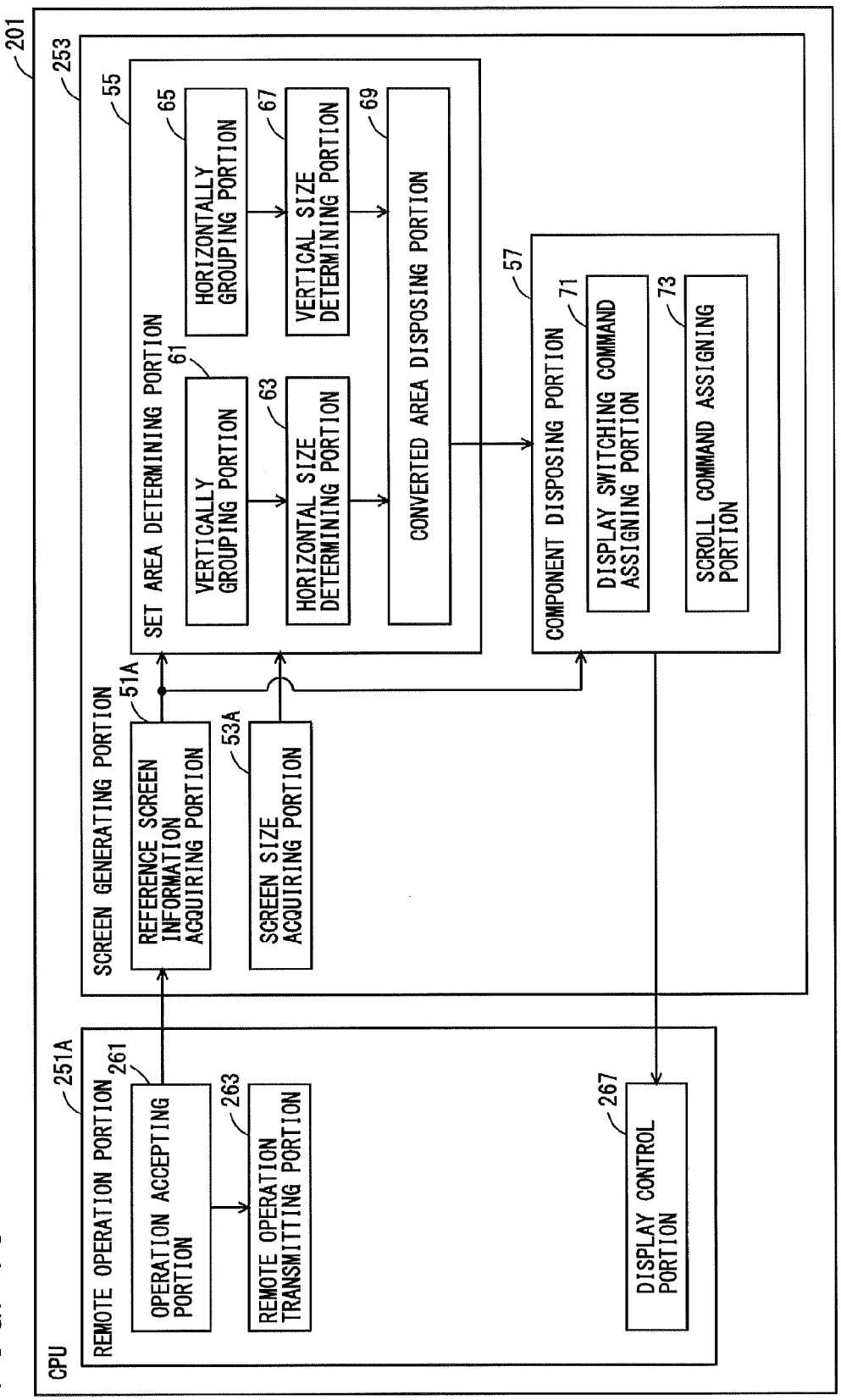
FIG. 19 is a block diagram showing, by way of example, the functions of a CPU included in the mobile information device according to the modification.

FIG. 19 is a block diagram showing, by way of example, the functions of a CPU included in the mobile information device according to the modification. The functions shown in FIG. 19 are formed in CPU 201 included in mobile information device 200 as CPU 201 executes a remote operation program of the modification stored in flash memory 203 or CD-ROM 211A. Referring to FIG. 19, the functions differ from those shown in FIG. 12 in that display screen receiving portion 265 and screen size transmitting portion 269 have been deleted, and that a screen generating portion 253 has been added. The other functions are identical to those shown in FIG. 12, and thus, the description thereof will not be repeated here.

Screen generating portion 253 has the functions identical to those of screen generating portion 83 shown in FIG. 5, except that reference screen information acquiring portion 51 and screen size acquiring portion 53 in screen generating portion 83 shown in FIG. 5 have been changed to a reference screen information acquiring portion 51A and a screen size acquiring portion 53A.

Reference screen information acquiring portion 51A acquires reference screen information from MFP 100 in response to a remote operation input from operation accepting portion 261. More specifically, reference screen information acquiring portion 51A controls wireless LAN I/F 208 to transmit to MFP 100 a remote operation including the screen identification information of the display screen that is specified by the remote operation input from operation accepting portion 261. When wireless LAN I/F 208 receives reference screen information from MFP 100, reference screen information acquiring portion 51A outputs the reference screen information to set area determining portion 55 and component disposing portion 57.

Screen size acquiring portion 53A acquires a screen size of display portion 206, and outputs the acquired screen size to set area determining portion 55.

Figure 20:
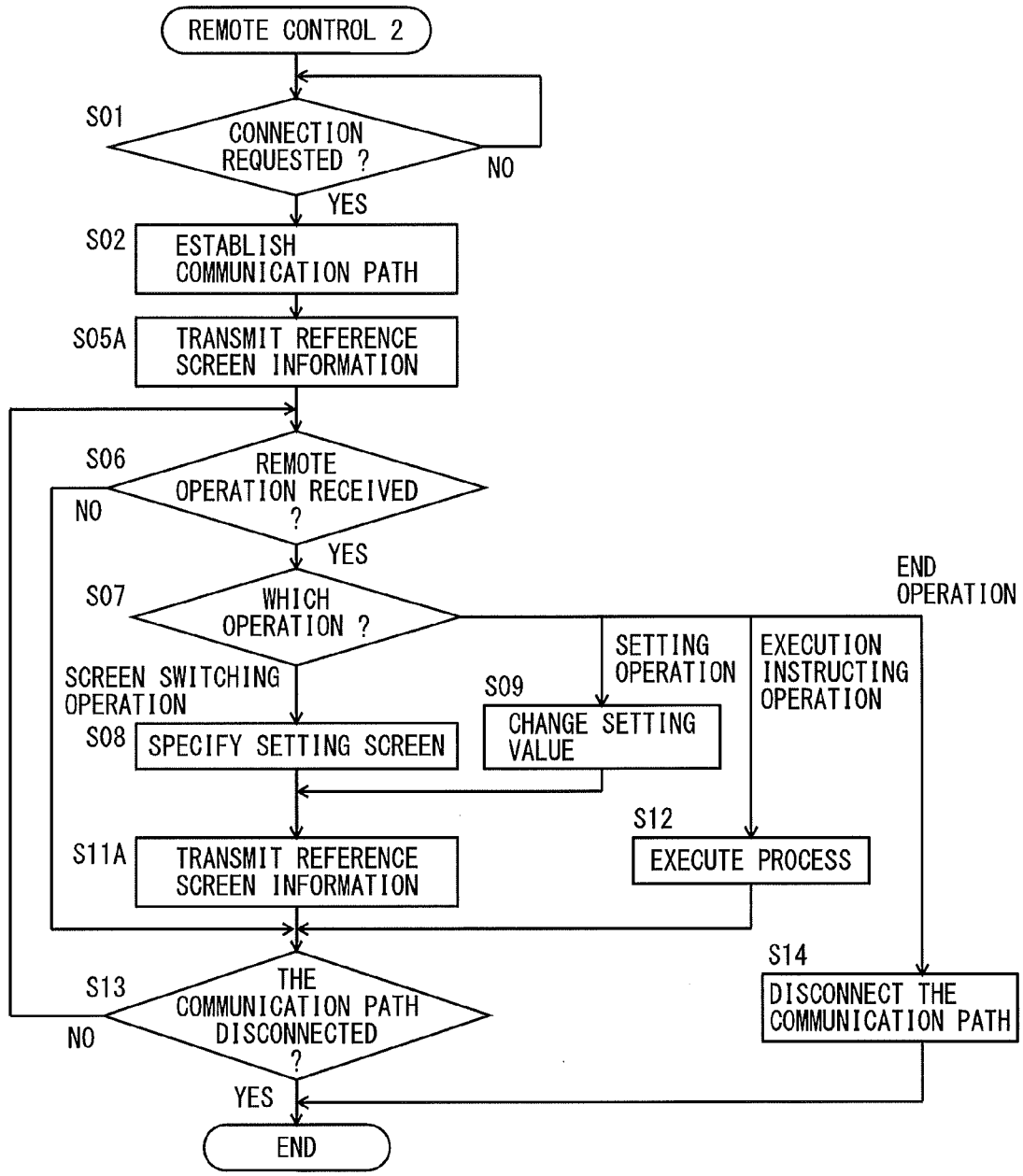
FIG. 20 is a flowchart illustrating an exemplary flow of the remote control process according to the modification.

FIG. 20 is a flowchart illustrating an exemplary flow of the remote control process according to the modification. The remote control process according to the modification is carried out by CPU 111A included in MFP 100 as CPU 111A executes the remote control program of the modification stored in ROM 113, HDD 115, or CD-ROM 118.

Referring to FIG. 20, the process shown differs from the remote control process shown in FIG. 13 in that steps S03, S04, and S10 have been deleted, and that steps S05 and S11 have been replaced with steps S05A and S11A. The other steps are the same as those in FIG. 13, and thus, the description thereof will not be repeated here.

In step S05A, CPU 111A transmits the reference screen information corresponding to the setting screen which has been set to the default, via communication I/F portion 112, to mobile information device 200 which is the remote operation device. The process then proceeds to step S06.

In step S08, CPU 111A specifies a setting screen, and the process proceeds to step S11A. In step S09, CPU 111A changes the setting value to the value specified by the setting operation, and the process proceeds to step S11A. In step S11A, CPU 111A transmits the reference screen information corresponding to the setting screen specified in step S08, or the reference screen information corresponding to the setting screen to which the setting value set in step S09 has been reflected, via communication I/F portion 112, to mobile information device 200 which is the remote operation device. The process then proceeds to step S13.

FIG. 21 is a flowchart illustrating an exemplary flow of the remote operation process according to the modification. The remote operation process according to the modification is carried out by CPU 201 included in mobile information device 200 as CPU 201 executes the remote operation program of the modification stored in flash memory 203 or CD-ROM 211A. Referring to FIG. 21, the process shown differs from the remote operation process shown in FIG. 17 in that steps S90 and S91 have been deleted, and that steps S85A and 85B have been added in place of step S85. The other steps are the same as those in FIG. 17, and thus, the description thereof will not be repeated here.

In step S85A, CPU 201 determines whether reference screen information has been received. CPU 201 controls wireless LAN I/F 208 to receive reference screen information from MFP 100. If the reference screen information has been received, the process proceeds to step S85B; otherwise, the process returns to step S84.

In step S85B, CPU 201 carries out a display screen generating process, and the process proceeds to step S86. The display screen generating process is identical to the display screen generating process shown in FIG. 14, except that the reference screen information that is acquired in step S21 is the reference screen information that was received from MFP 100 in step S85A. In the following step S86, CPU 201 displays the display screen generated in step S85B, on display portion 206.

As described above, mobile information device 200 according to the modification functions as a remote operation device which remotely controls MFP 100 which is an image forming apparatus. Mobile information device 200 transmits a remote operation specifying a setting screen to MFP 100, and receives from MFP 100 the reference screen information corresponding to the setting screen. On the basis of the screen size of display portion 206 of mobile information device 200 and the layout information included in the reference screen information, mobile information device 200 determines, for each of one or more sets, a converted area corresponding to the set in the display screen, and disposes the converted areas corresponding respectively to the one or more sets such that the positional relationships between the plurality of converted areas become identical to the positional relationships between the plurality of areas within the reference screen. For each of the one or more sets, mobile information device 200 disposes, in the converted area corresponding to the set within the display screen, one or more components classified in that set, with their sizes identical to those within the references screen. In this manner, mobile information device 200 generates the display screen, and displays the generated display screen on display portion 206. Here, the converted areas corresponding respectively to the one or more sets are disposed in the display screen such that the positional relationships between the plurality of converted areas become identical to the positional relationships between the plurality of areas within the reference screen. Therefore, the plurality of components can be disposed in the display screen in the same manner as in the reference screen (setting screen). Further, the one or more components are disposed, in the converted areas, in the same sizes as those within the reference screen. This allows a user to readily recognize the components, thereby avoiding operation errors. Accordingly, it is possible to display a display screen which looks similar to the setting screen but differs in size from the setting screen, without changing the sizes of the components in the setting screen.

Further, it is unnecessary to design the screen which is to be displayed on mobile information device 200 for remotely operating MFP 100, separately from the setting screen which is displayed on MFP 100. This can improve the efficiency in designing a screen. Further, MFP 100 does not have to generate a display screen, which can reduce the load on MFP 100.

While MFP 100 was described as an example of the image forming apparatus and mobile information devices 200, 200A, and 200B were described as examples of the remote operation device in the above embodiment, the present invention can of course be understood as a remote control method for causing MFP 100 to perform the remote control process shown in FIGS. 13 to 16 or FIG. 20, as a remote control program for causing CPU 111 or 111A controlling MFP 100 to perform the remote control method, as a remote operation method for causing mobile information device 200, 200A, or 200B to perform the remote operation process shown in FIG. 17 or 21, or as a remote operation program for causing CPU 201 controlling the corresponding mobile information device 200, 200A, or 200B to perform the remote operation method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A screen generating apparatus comprising:
 a reference screen information acquiring portion to acquire reference screen information, the reference screen information including a plurality of components classified into one or more sets and layout information indicating, for each one of said one or more sets, a relative positional relationship, within a reference screen, between an area corresponding to the one of said one or more sets and areas corresponding respectively to the other ones of said one or more sets;
 a screen size acquiring portion to acquire a screen size of a display portion;
 a set area determining portion to determine, for the each one of said one or more sets, a converted area corresponding to the one of said one or more sets in a display screen, on the basis of said acquired screen size and said layout information included in said reference screen information; and
 a component disposing portion to dispose said plurality of components included in said reference screen information, in the converted areas within the display screen corresponding respectively to said one or more sets, each component being disposed in the same size as that in the reference screen, wherein a size of the reference screen is different from the screen size of the display portion.

2. The screen generating apparatus according to claim 1, wherein said component disposing portion includes a switching command assigning portion which is operable, for the each one of said one or more sets, in the case where the converted area corresponding to the one of said one or more sets is not large enough to dispose therein all of the one or more components classified in the one of said one or more sets at the same time, to dispose displayed component(s), which is/are part of the one or more components classified in the one of said one or more sets, in said converted area, and also assign to said converted area a display switching command for disposing yet-to-be displayed component(s), which is/are component(s) other than said displayed component(s) among said one or more components, in said converted area in place of said displayed component(s).

3. The screen generating apparatus according to claim 1, wherein said component disposing portion includes a scroll command assigning portion which is operable, for the each one of said one or more sets, in the case where the converted area corresponding to the one of said one or more sets is not large enough to dispose therein a whole of the component classified in the one of said one or more sets, to dispose a displayed part, which is part of the component classified in the one of said one or more sets, in said converted area, and also assign to said converted area a scroll command for disposing a yet-to-be displayed part, other than said displayed part of said component, in said converted area in place of said displayed part.

4. An image forming apparatus comprising the screen generating apparatus according to claim 1.

5. The screen generating apparatus according to claim 1, wherein said screen generating apparatus is an image forming apparatus remotely controlled by a remote operation device, said screen generating apparatus further comprising a remote control portion to execute a process in accordance with a remote operation received from said remote operation device, wherein said remote control portion includes a display screen transmitting portion to transmit said display screen to said remote operation device, said screen size acquiring portion acquires, from said remote operation device, a screen size of said display portion included in said remote operation device, and said reference screen information acquiring portion acquires reference screen information corresponding to a setting screen specified by a remote operation received from said remote operation device.

6. The screen generating apparatus according to claim 1, wherein said screen generating apparatus is a remote operation device which remotely controls an image forming apparatus, said screen generating apparatus further comprising a remote operation portion to remotely control said image forming apparatus, wherein said remote operation portion includes
an operation accepting portion to accept a user operation,
a display control portion to display said display screen on said display portion, and
a remote operation transmitting portion to transmit said accepted operation, as a remote operation, to said image forming apparatus, and said reference screen information acquiring portion receives said reference screen information that said image forming apparatus transmits in response to said remote operation transmitted.

7. The screen generating apparatus according to claim 1, wherein said set area determining portion includes:

a vertically grouping portion to, on the basis of said layout information, group any sets, among said one or more sets, having their corresponding areas sharing a common range in the vertical direction, into a vertical-range sharing group;

a horizontal size determining portion to, for each of said sets classified in a respective vertical-range sharing group, determine a horizontal size of each of a first plurality of converted areas respectively corresponding to each of said sets;

a horizontally grouping portion to, on the basis of said layout information, group any sets, among said one or more sets, having their corresponding areas sharing a common range in the horizontal direction, into a horizontal-range sharing group; and a vertical size determining portion to, for each of said sets classified in a respective horizontal-range sharing group, determine a vertical size of each of a second plurality of converted areas respectively corresponding to each of said sets.

8. A screen generating apparatus comprising:

a reference screen information acquiring portion to acquire reference screen information, the reference screen information including a plurality of components classified into one or more sets and layout information for disposing said plurality of components in a reference screen;

a screen size acquiring portion to acquire a screen size of a display portion;

a set area determining portion to determine, for each one of said one or more sets, a converted area corresponding to the one of said one or more sets in a display screen, on the basis of said acquired screen size and said layout information included in said reference screen information; and a component disposing portion to dispose said plurality of components included in said reference screen information, in the converted areas within the display screen corresponding respectively to said one or more sets, each component being disposed in the same size as that in the reference screen, said layout information includes, for the each one of said one or more sets, positional information indicating a relative positional relationship, within said reference screen, between an area corresponding to the one of said one or more sets and areas corresponding respectively to the other one or more sets, said set area determining portion includes a converted area disposing portion which disposes the converted areas corresponding respectively to said one or more sets, in accordance with the positional information included in said layout information, such that positional relationships between the plurality of converted areas become identical to positional relationships between the plurality of areas within said reference screen, said layout information further includes, for the each one of said one or more sets, a size of the area corresponding to the one of said one or more sets and shrinkability information in each of vertical and horizontal directions of the area, and said set area determining portion further includes
a vertically grouping portion to group any sets, among said one or more sets, having their corresponding areas sharing a common range in the vertical direction, into a vertical-range sharing group, a horizontal size determining portion to determine a horizontal size of a horizontally variable set, among the sets classified in said vertical-range sharing group, determined to be shrinkable in the horizontal direction by said layout information, on the basis of a horizontal size of said acquired screen size and a horizontal size of a horizontally fixed set, among the sets classified in said group, determined to be unshrinkable in the horizontal direction by said layout information, a horizontally grouping portion to group any sets, among said one or more sets, having their corresponding areas sharing a common range in the horizontal direction, into a horizontal-range sharing group, and a vertical size determining portion to determine a vertical size of a vertically variable set, among the sets classified in said horizontal-range sharing group, determined to be shrinkable in the vertical direction by said layout information, on the basis of a vertical size of said acquired screen size and a vertical size of a vertically fixed set, among the sets classified in said group, determined to be unshrinkable in the vertical direction by said layout information.

9. The screen generating apparatus according to claim 3, wherein
said layout information further includes, for the each one of said one or more sets, a minimum display size and a priority for each of the horizontal and vertical directions, and
said set area determining portion determines the sizes of the converted areas corresponding respectively to said one or more sets such that, for each of the horizontal and vertical directions, the higher the priority of the corresponding one of said one or more sets is, the greater the size of the converted area becomes.

10. A screen generating method for causing a screen generating apparatus to perform:
a reference screen information acquiring step of acquiring reference screen information, the reference screen information including a plurality of components classified into one or more sets and layout information indicating, for each one of said one or more sets, a relative positional relationship, within a reference screen, between an area corresponding to the one of said one or more sets and areas corresponding respectively to the other ones of said one or more sets;
a screen size acquiring step of acquiring a screen size of a display portion;
a set area determining step of determining, for the each one of said one or more sets, a converted area corresponding to the one of said one or more sets in a display screen, on the basis of said acquired screen size and said layout information included in said reference screen information; and
a component disposing step of disposing said plurality of components included in said reference screen information, in the converted areas within the display screen corresponding respectively to said one or more sets, each component being disposed in the same size as that in the reference screen, wherein a size of the reference screen is different from the screen size of the display portion.

11. A non-transitory computer-readable recording medium encoded with a screen generating program for causing a computer to perform the screen generating method according to claim 10.

12. The non-transitory computer-readable recording medium according to claim 11, wherein said component disposing step includes a switching command assigning step of, for the each one of said one or more sets, in the case where the converted area corresponding to the one of said one or more sets is not large enough to dispose therein all of the one or more components classified in the one of said one or more sets at the same time, disposing displayed component(s), which is/are part of the one or more components classified in the one of said one or more sets, in said converted area, and also assigning to said converted area a display switching command for disposing yet-to-be displayed component(s), which is/are component(s) other than said displayed component(s) among said one or more components, in said converted area in place of said displayed component(s).

13. The non-transitory computer-readable recording medium according to claim 11, wherein said component disposing step includes a scroll command assigning step of, for the each one of said one or more sets, in the case where the converted area corresponding to the one of said one or more sets is not large enough to dispose therein a whole of the component classified in the one of said one or more sets, disposing a displayed part, which is part of the component classified in the one of said one or more sets, in said converted area, and also assigning to said converted area a scroll command for disposing a yet-to-be displayed part, other than said displayed part of said component, in said converted area in place of said displayed part.

14. The non-transitory computer-readable recording medium according to claim 11, wherein said screen generating apparatus is included in an image forming apparatus.

15. The non-transitory computer-readable recording medium according to claim 11, wherein said screen generating apparatus is an image forming apparatus remotely controlled by a remote operation device,
said screen generating method further causing said image forming apparatus to perform a remote control step of executing a process in accordance with a remote operation received from said remote operation device, wherein
said remote control step includes a display screen transmitting step of transmitting said display screen to said remote operation device,
said screen size acquiring step includes a step of acquiring, from said remote operation device, a screen size of said display step included in said remote operation device, and
said reference screen information acquiring step includes a step of acquiring reference screen information corresponding to a setting screen specified by a remote operation received from said remote operation device.

16. The non-transitory computer-readable recording medium according to claim 11, wherein said screen generating apparatus is a remote operation device which remotely controls an image forming apparatus,
said screen generating method further causing said remote operation device to perform a remote operation step of remotely controlling said image forming apparatus, wherein
said remote operation step includes
an operation accepting step of accepting a user operation,
a display control step of displaying said display screen on said display portion, and
a remote operation transmitting step of transmitting said accepted operation, as a remote operation, to said image forming apparatus, and
said reference screen information acquiring step includes a step of receiving said reference screen information that said image forming apparatus transmits in response to said remote operation transmitted.

17. The non-transitory computer-readable recording medium according to claim 11, wherein said set area determining step includes:
on the basis of said layout information, grouping any sets, among said one or more sets, having their corresponding areas sharing a common range in the vertical direction, into a vertical-range sharing group;

for each of said sets classified in a respective vertical-range sharing group, determining a horizontal size of each of a first plurality of converted areas respectively corresponding to each of said sets;

on the basis of said layout information, grouping any sets, among said one or more sets, having their corresponding areas sharing a common range in the horizontal direction, into a horizontal-range sharing group; and for each of said sets classified in a respective horizontal-range sharing group, determining a vertical size of each of a second plurality of converted areas respectively corresponding to each of said sets.

18. A screen generating method for causing a screen generating apparatus to perform:

a reference screen information acquiring step of acquiring reference screen information, the reference screen information including a plurality of components classified into one or more sets and layout information for disposing said plurality of components in a reference screen;

a screen size acquiring step of acquiring a screen size of a display portion;

a set area determining step of determining, for the each one of said one or more sets, a converted area corresponding to the one of said one or more sets in a display screen, on the basis of said acquired screen size and said layout information included in said reference screen information; and a component disposing step of disposing said plurality of components included in said reference screen information, in the converted areas within the display screen corresponding respectively to said one or more sets, each component being disposed in the same size as that in the reference screen, said layout information includes, for the each one of said one or more sets, positional information indicating a relative positional relationship, within said reference screen, between an area corresponding to the one of said one or more sets and areas corresponding respectively to the other one or more sets, said set area determining step includes a converted area disposing step of disposing the converted areas corresponding respectively to said one or more sets, in accordance with the positional information included in said layout information, such that positional relationships between the plurality of converted areas become identical to positional relationships between the plurality of areas within said reference screen, said layout information further includes, for the each one of said one or more sets, a size of the area corresponding to the one of said one or more sets and shrinkability information in each of vertical and horizontal directions of the area, and said set area determining step further includes a vertically grouping step of grouping any sets, among said one or more sets, having their corresponding areas sharing a common range in the vertical direction, into a vertical-range sharing group, a horizontal size determining step of determining a horizontal size of a horizontally variable set, among the sets classified in said vertical-range sharing group, determined to be shrinkable in the horizontal direction by said layout information, on the basis of a horizontal size of said acquired screen size and a horizontal size of a horizontally fixed set, among the sets classified in said group, determined to be unshrinkable in the horizontal direction by said layout information, a horizontally grouping step of grouping any sets, among said one or more sets, having their corresponding areas sharing a common range in the horizontal direction, into a horizontal-range sharing group, and a vertical size determining step of determining a vertical size of a vertically variable set, among the sets classified in said horizontal-range sharing group, determined to be shrinkable in the vertical direction by said layout information, on the basis of a vertical size of said acquired screen size and a vertical size of a vertically fixed set, among the sets classified in said group, determined to be unshrinkable in the vertical direction by said layout information.

19. A non-transitory computer-readable recording medium encoded with a screen generating program for causing a computer to perform the screen generating method according to claim 18.

20. The screen generating method according to claim 19, wherein said layout information further includes, for the each one of said one or more sets, a minimum display size and a priority for each of the horizontal and vertical directions, and said set area determining step further includes a step of determining the sizes of the converted areas corresponding respectively to said one or more sets such that, for each of the horizontal and vertical directions, the higher the priority of the corresponding one of said one or more sets is, the greater the size of the converted area becomes.

* * * * *